(12) United States Patent
Adachi et al.

(10) Patent No.: US 10,847,109 B2
(45) Date of Patent: Nov. 24, 2020

(54) ACTIVE MATRIX SUBSTRATE AND DISPLAY PANEL

(71) Applicant: Sharp Kabushiki Kaisha, Sakai (JP)

(72) Inventors: Hiroyuki Adachi, Sakai (JP); Shige Furuta, Sakai (JP); Yuhichiroh Murakami, Sakai (JP); Hidekazu Yamanaka, Sakai (JP); Takahiro Yamaguchi, Sakai (JP); Kohei Hosoyachi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/690,182

(22) Filed: Nov. 21, 2019

(65) Prior Publication Data

US 2020/0168173 A1 May 28, 2020

Related U.S. Application Data

(60) Provisional application No. 62/772,315, filed on Nov. 28, 2018.

(51) Int. Cl.
*G09G 3/36* (2006.01)
(52) U.S. Cl.
CPC ..... *G09G 3/3677* (2013.01); *G09G 2300/0426* (2013.01); *G09G 2310/0297* (2013.01); *G09G 2320/0223* (2013.01)

(58) Field of Classification Search
CPC ......... G09G 3/3677; G09G 2310/0297; G09G 2320/0223; G09G 2300/0426; G02F 1/1345
See application file for complete search history.

(56) References Cited

U.S. PATENT DOCUMENTS

2018/0204889 A1* 7/2018 Yu .................. H01L 27/3223

FOREIGN PATENT DOCUMENTS

JP 2007-041229 A 2/2007

* cited by examiner

*Primary Examiner* — Andrew Sasinowski
(74) *Attorney, Agent, or Firm* — Keating & Bennett, LLP

(57) ABSTRACT

An active matrix substrate includes pixel lines disposed in a display area and connected to pixels, respectively, a signal input section for inputting a signal to the pixel lines, and connection lines connected to the signal input section and the pixel lines. The pixel lines include a short pixel line having a smaller line length than other pixel lines. The connection lines include a short pixel connection line connected to the short pixel line and other connection lines connected to the other pixel lines, one connection line of the short pixel connection line and the other connection lines includes a line resistance adjusting section that adjusts a line resistance of the one connection line according to an electric resistance of the pixel line connected to the one connection line.

11 Claims, 13 Drawing Sheets

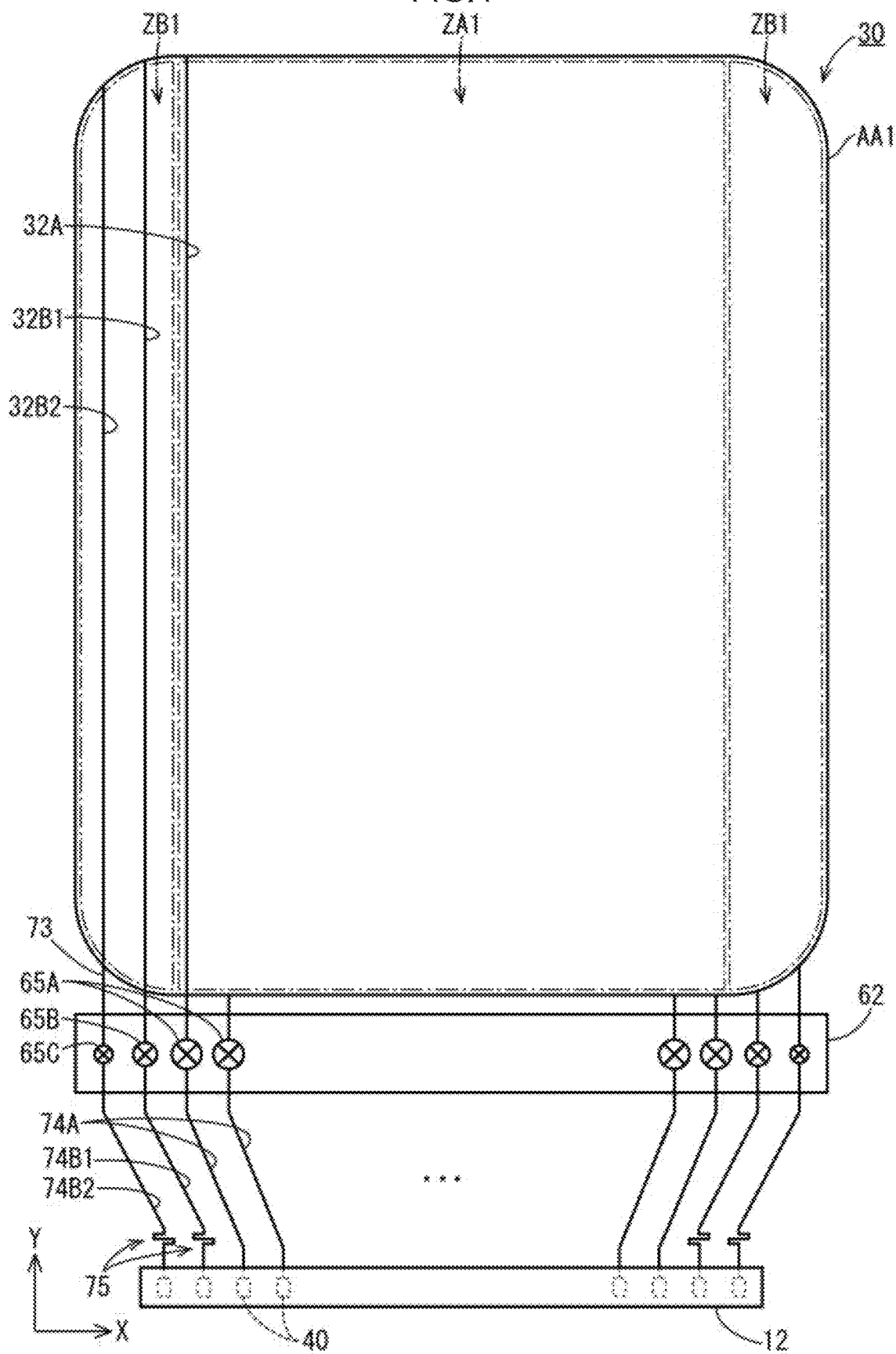

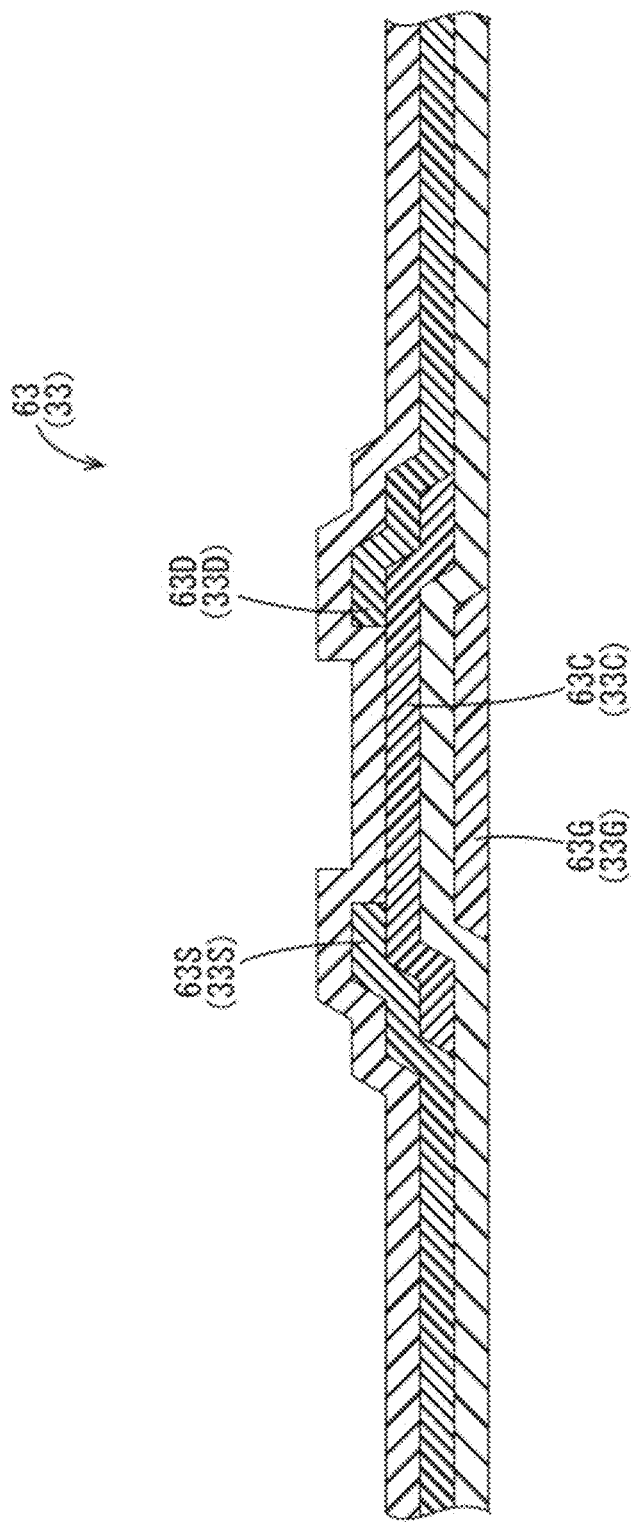

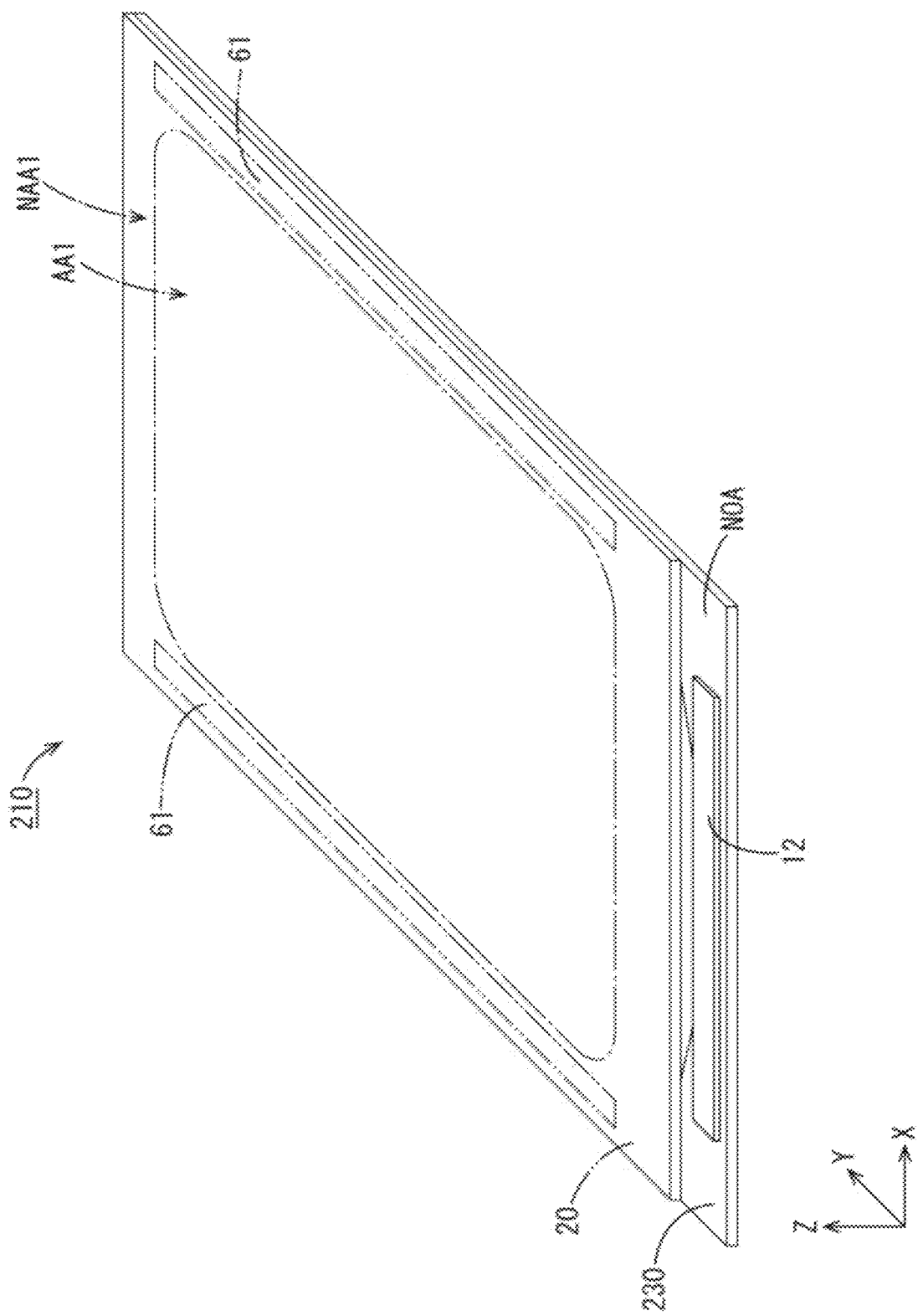

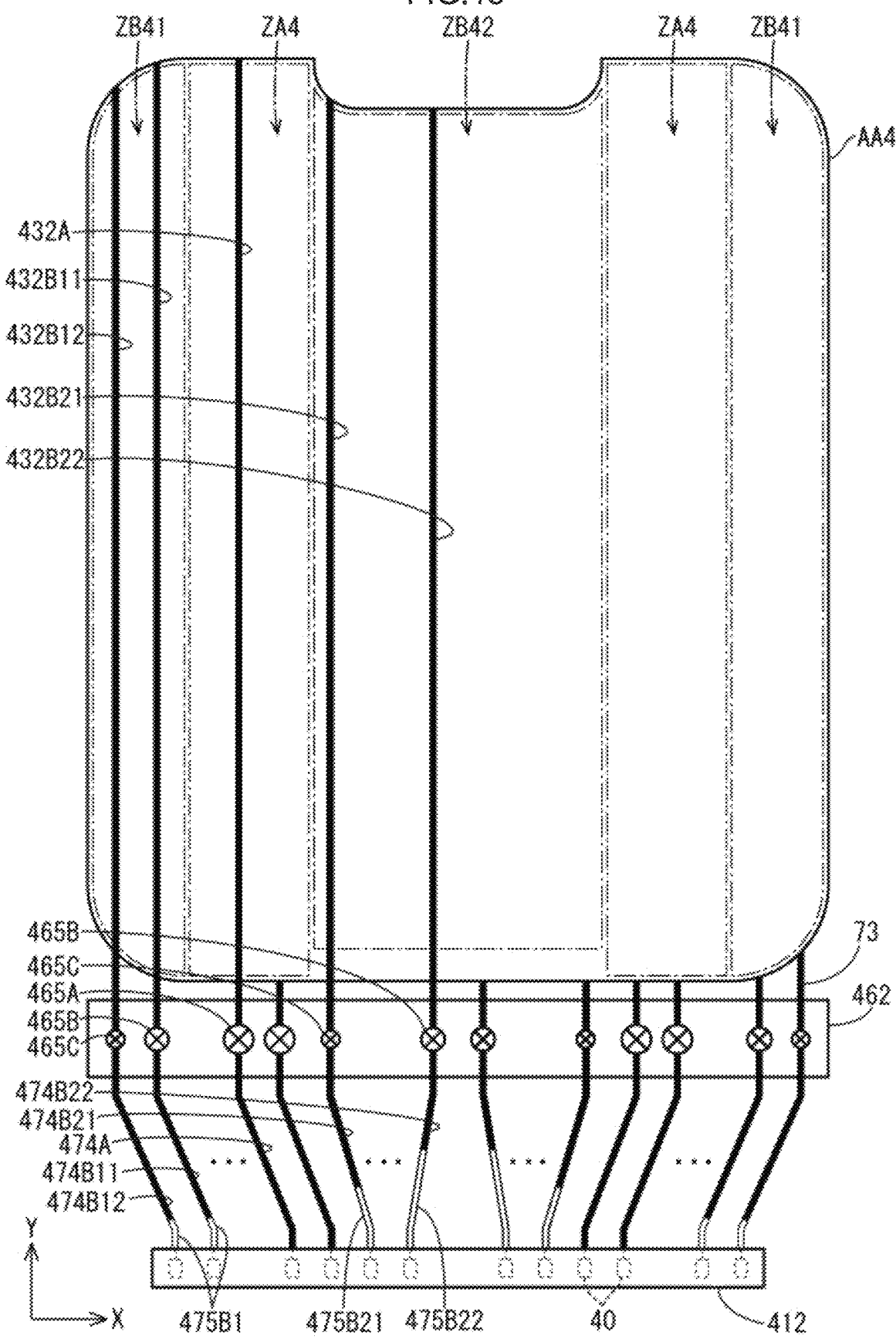

ACTIVE MATRIX SUBSTRATE AND DISPLAY PANEL

CROSS REFERENCE TO RELATED APPLICATION

This application claims priority from U.S. Provisional Patent Application No. 62/772,315 filed on Nov. 28, 2018. The entire contents of the priority application are incorporated herein by reference.

TECHNICAL FIELD

The technology described herein relates to an active matrix substrate and a display panel.

BACKGROUND ART

A display panel displaying an image has a configuration in which a layer of an electric optical substance such as a liquid crystal is sandwiched between two substrates that are opposed to each other. One of the substrates is an active matrix substrate and another one of the substrates is a counter substrate. The display panel includes one plate surface as a display surface and the display surface is divided into a display area where an image is displayed and a non-display area that surrounds the display area. On an opposed surface that is opposite the counter substrate in the display area of the active matrix substrate, gate lines (scanning lines, row lines, pixel lines) extending in parallel to each other, source lines (signal lines, column lines, pixel lines) extending perpendicular to the gate lines, and switching components and pixel electrodes that are disposed on intersections of the gate lines and the source lines are disposed. In the non-display area, a signal input section where electric signals are input is generally disposed along a side of the display area that extends perpendicular to the source lines and connection lines that connect the signal input section and the source lines or the gate lines are disposed. The electric signal that is input via the signal input section is transferred to each of the lines through the connection lines and supplied to the electrodes within the display area as appropriate. Then, a voltage is applied to the electric optical substance layer such that optical properties (light transmissive properties or reflectivity) of the layer are changed and an image is displayed on the display area.

An active matrix substrate described in Japanese Unexamined Patent Application Publication No. 2007-41229 has been known as an example of the active matrix substrate. The active matrix substrate includes a source line driving circuit that is multiplexer-driven and the ON resistances of the switches included in the driving circuit are set to different values. Specifically, by adjusting a size of the transistor constituting each switch, the ON resistance of each of the switches is set according to the resistance value of a connection line connecting the switch and an image signal input terminal. Accordingly, the input of an electric signal to each of the source lines becomes uniform and image display quality is less likely to be lowered due to unevenness of line resistances of the connection lines formed on the active matrix substrate.

Recently, the display area of the display panel has been demanded to be increased as much as possible. Therefore, the width of the non-display area has been reduced as a whole and a shape of the display area has been varied. The shape of the display area of the display panel that has been quadrangular (square or a rectangular) is changed such that a shape of the display area is formed only to exclude a section where a component necessarily disposed in the non-display area. Thus, a ratio of the display area in the display panel can be increased. Change of the shape of the display area means to change the shape of the display area to a shape other than a quadrangular shape and includes changing the shape of the display area not only to a polygonal shape such as a circle, an oval, a triangle, a pentagon, and a polygon having more than five corners but also a shape having an outline part of which is projected or recessed, and an irregular shape such as a cloud shape. The display panel is used in a wide application filed and is applied to display devices used in various conditions and therefore, display panels (hereinafter, may be referred to as a modified-shaped display panel) including various shaped display areas have been demanded.

In the modified-shaped display panel, unlike the conventional display panel including a quadrangular display area, a length of the source lines or the number of the switching components and the electrodes connected to the source lines may differ according to the position within the display area (hereinafter, may be referred to as an address). This may cause unevenness in the electric resistances of the source lines. For example, in the modified-shaped display panel including the display area having a recessed portion in the outline thereof, the source line disposed at the recessed portion is shorter than other source lines disposed at the outline other than the recessed portion and the number of switching components and the pixel electrodes connected to the source lines at the recessed portion is smaller. Therefore, the electric resistance of the source lines disposed at the recessed portion is lower than that of other source lines and a charging potential of the corresponding pixel electrode connected to the source line is higher than a charging potential of the pixel connected to other source lines. As a result, screen luminance of the portion becomes higher than other portions and luminance unevenness is caused, and this may lower image display quality.

An object of the technology described in Japanese Unexamined Patent Application Publication No. 2007-41229 is trying to restrict unevenness of the line resistances caused by the different lengths of the connection lines between the signal input section (the image signal input terminal) and the switches of the source line driving circuit. The above technology does not consider unevenness of electric resistances caused by different lengths of the source lines (the pixel lines) or different loads. The technology described in Japanese Unexamined Patent Application Publication No. 2007-41229 necessarily requires design change of a structure of each circuit component such as a transistor or a circuit structure to adjust the ON resistance of the switch and this needs time and cost. Therefore, the technology is not suitable for minute adjustment. If the transistors are connected in parallel and a size of each of the transistors is adjusted, the ON resistance value of the switch can be changed in an analog manner. However, it is not practical as is described in Japanese Unexamined Patent Application Publication No. 2007-41229. Therefore, with the technology of the Patent Publication, it is difficult to uniform the electric resistances of the line paths that are varied in a continuous and irregular manner in modified-shaped display panels having various shapes. In this specification, the electric resistance means a total of a resistance of the line itself, that is a line resistance, and a resistance of a load (a circuit or a circuit component) disposed on the line.

SUMMARY

The technology described herein was made in view of the above circumstances. An object is to uniform electric resistances of line paths as a whole extending from a signal input section to ends of image lines in an active matrix substrate including source lines (image lines) having different lengths and different line loads with a simple method and with high accuracy.

An active matrix substrate according to the technology described herein includes pixel lines disposed in a display area where pixels are disposed, the pixel lines being connected to the pixels, respectively, a signal input section for inputting a signal to the pixel lines, and connection lines connected to the signal input section and the pixel lines. The pixel lines include a short pixel line having a line length smaller than that of other pixel lines. The connection lines include a short pixel connection line that is connected to the short pixel line and other connection lines that are connected to the other pixel lines, one connection line of the short pixel connection line and the other connection lines includes a line resistance adjusting section that adjusts a line resistance of the one connection line according to an electric resistance of the pixel line connected to the one connection line.

A display panel according to the technology described herein includes the active matrix substrate and a counter substrate that is opposite and bonded to the active matrix substrate.

According to the technology described herein, a modified-shaped display panel having good display quality can be provided.

BRIEF DESCRIPTION OF THE DRAWINGS

FIG. 4 is a schematic plan view illustrating a brief line structure of a liquid crystal panel.

FIG. 6 is a schematic view illustrating a brief cross-sectional view of a driving TFT (a pixel TFT).

FIG. 8 is a perspective view illustrating a brief structure of a liquid crystal panel according to a second embodiment.

FIG. 13 is a planar schematic view illustrating a brief line structure of the liquid crystal panel.

DETAILED DESCRIPTION

First Embodiment

Figure 1:
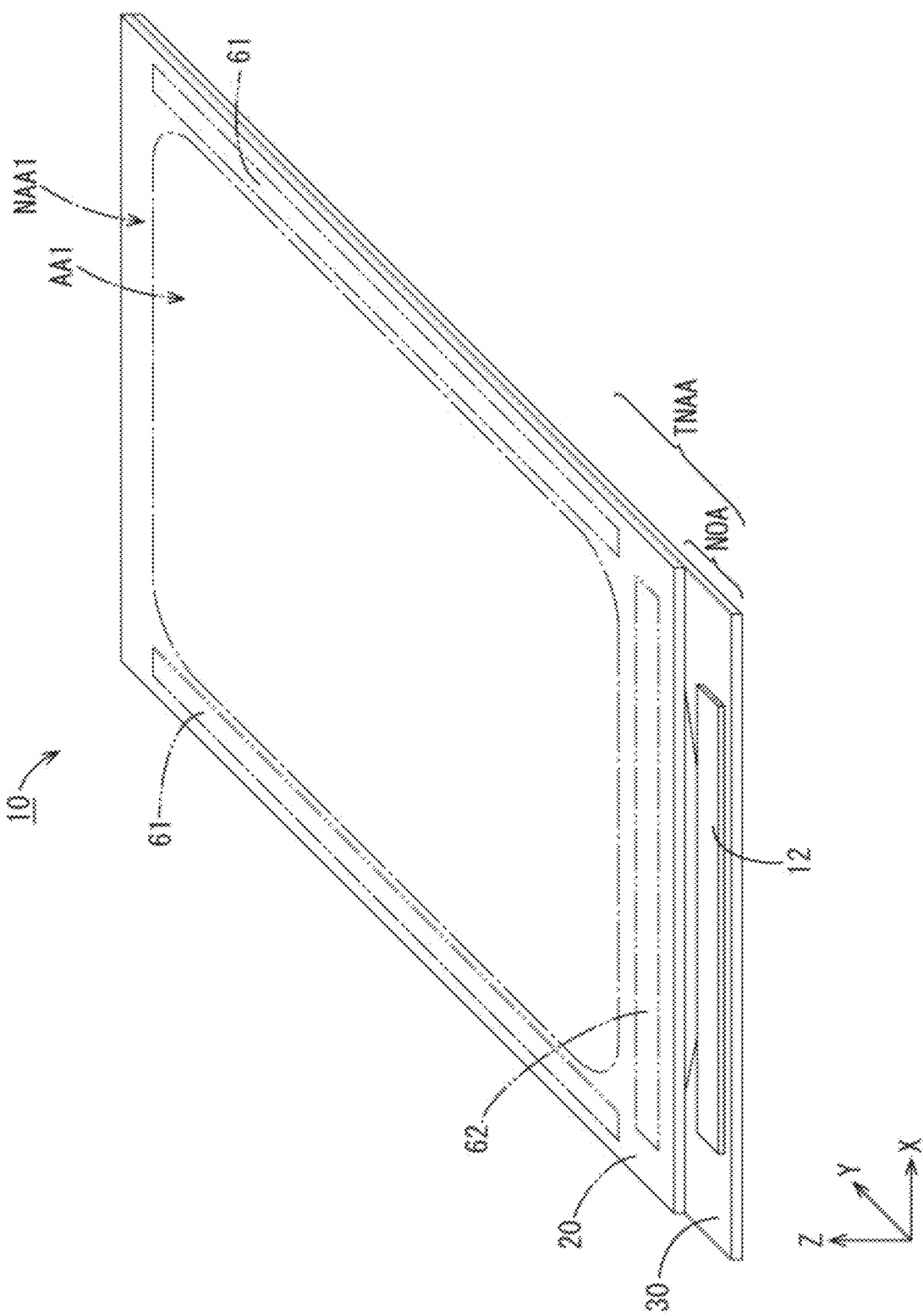
FIG. 1 is a perspective view illustrating a brief structure of a liquid crystal panel according to a first embodiment.

A first embodiment will be described with reference to FIGS. 1 to 7E. In the first embodiment section, a liquid crystal panel 10 (an example of a display panel) will be described. X-axes, Y-axes, and Z-axes may be present in the drawings. The axes in each drawing correspond to the respective axes in other drawings. A front and an upper side on the sheets in FIGS. 1, 8, 10, and 12 correspond to a front side or a front surface side (and a rear and lower side in the same drawings corresponds to a rear side or a rear surface side). An upper side in FIGS. 2, 3, 4, 5, 9, 11, and 13 corresponds to an upper side (a lower side in the same drawings corresponds to a lower side), and a left side in the same drawings corresponds to a left side (a right side in the same drawings corresponds to a right side). For the same multiple components, only one of those components may be indicated by a reference number and others may not be indicated by the reference number.

First, a brief structure of the liquid crystal panel 10 will be described with reference to FIG. 1. The liquid crystal panel 10 of the first embodiment may be used in a display panel of a display device included in various types of electronic devices, such as a mobile phone (including a smartphone), a notebook computer (including a tablet computer), a wearable device (including a smart watch), a portable information device (including an electronic book and a PDA), and a portable game console. In the first embodiment, the liquid crystal panel 10 has a screen size in a range from some inches to some dozen inches, which is generally classified into a small size or a small-to-middle size panel. The screen size is not particularly limited to the above range. The technology described herein may be applied to display panels having screen sizes in dozens of inches, which are generally classified into a middle size or a large size (or an extra-large size) panels.

As illustrated in FIG. 1, the liquid crystal panel 10 in the first embodiment has a vertically-long rectangular plate shape (a quadrangular plate shape) as a whole. The liquid crystal panel 10 has a plate surface having a short-side direction and a long-side direction that match an X-axis direction and a Y-axis direction, respectively. The liquid crystal panel 10 having a substantially plate shape includes front and rear plate surfaces. The front plate surface is configured as a display surface on which images are displayed and display images are viewed from the front side of the liquid crystal panel 10. A backlight unit is disposed behind the liquid crystal panel 10. The liquid crystal panel 10 is illuminated with light from the backlight unit from the back side.

The liquid crystal panel 10 may be a so-called liquid crystal cell having a known configuration and includes a pair of substrates 20, 30 of rectangular plates and plate surfaces thereof are opposed to each other and bonded together. The substrates 20, 30 bonded together with sealing material such as epoxy resin while having a predefined gap therebetween. A space between the substrates 20, 30 is filled with a liquid crystal material to form a liquid crystal layer. Orientation of molecules in the liquid crystal material varies when electrical signals are supplied. A known material may be used for the liquid crystal material.

One of the substrates 20, 30 illustrated in FIG. 1 on the rear is defined as an active matrix substrate 30 (an array board, a device board. The other one on the front is defined as a counter substrate 20. The counter substrate 20 may be referred to as a color filter substrate (a CF substrate) or a common electrode substrate according to a structure thereof. As illustrated in FIG. 1, the active matrix substrate 30 is configured to have a planar dimension greater than that of the counter substrate 20. The active matrix substrate 30 has a substrate non-overlapping area NOA on a plate surface thereof and the counter substrate 20 is not overlapped with the substrate non-overlapping area NOA. In the first embodiment, the active matrix substrate 30 has a Y-axis dimension that is greater than that of the counter substrate 20 and has an X-axis dimension that is equal to that of the counter substrate 20. The active matrix substrate 30 and the counter substrate 20 are opposed each other such that upper short sides thereof are aligned with each other. The active matrix substrate 30 includes the substrate non-overlapping area NOA in a lower short-side section thereof and components such as a driver 12 having a laterally-long flat rectangular parallelepiped shape and a flexible circuit board are mounted on the substrate non-overlapping area NOA. The driver 12 is an LSI chip including a driving circuit therein and is configured to perform a process according to various kinds of signals supplied from an external signal supply source (a control board) and output output signals to a display area AA1, which will be described later.

As illustrated in FIG. 1, the liquid crystal panel 10 includes a display area AA1 (an active area, a pixel area) in a middle of an area of a plate surface thereof where the active matrix substrate 30 and the counter substrate 20 are overlapped with each other. The display area AA1 in the first embodiment is an area surrounded by a chain line in FIG. 1 and has a substantially rectangular shape that is slightly smaller than that of the plate surface of the counter substrate 20 as a whole. However, four corners of the display area AA1 are chamfered to be in an R shape and have a modified shape (namely, the liquid crystal panel 10 is an example of modified-shaped display panel). On the plate surface of the liquid crystal panel 10, an area of a frame shape (a substantially quadrangular frame shape) that surrounds the display area AA1 is a non-display area NAA1 (a non-active area, non-pixel area). In the display area AA1, pixels PX are provided as will be described later with reference to FIG. 2 and images can be displayed. In the non-display area NAA1, no pixel PX is disposed and no image is displayed. In the following, on a lower side of the liquid crystal panel 10, an area of the non-display area NAA1 including the substrate non-overlapping area NOA is referred to as a terminal-side non-display area TNAA.

The substrates 20, 30 include light transmissive substrates, respectively. The light transmissive substrates are substantially transparent to pass visible light. The light transmissive substrates have insulating properties. Glass substrates, silicon substrates, or heat-resistant plastic substrates may be used as the light transmissive substrates. Polarizing plates are bonded to outer surfaces (on opposite sides from the liquid crystal layer) of the substrates 20, 30. Different kinds of films are stacked on inner surfaces (closer to the liquid crystal layer, surfaces opposed to each other) of the light transmissive substrates. The films are formed in predefined patterns by a known film forming method, for example, a photolithography method. Thus, different kinds of structures are formed. Alignment films are formed on innermost surfaces of the substrates 20, 30, that is, the surfaces that contact the liquid crystal layer. The alignment films are bonded to the substrates such that alignment surfaces of the alignment films are opposed to each other after required alignment processing that includes rubbing and photo-alignment.

Figure 2:
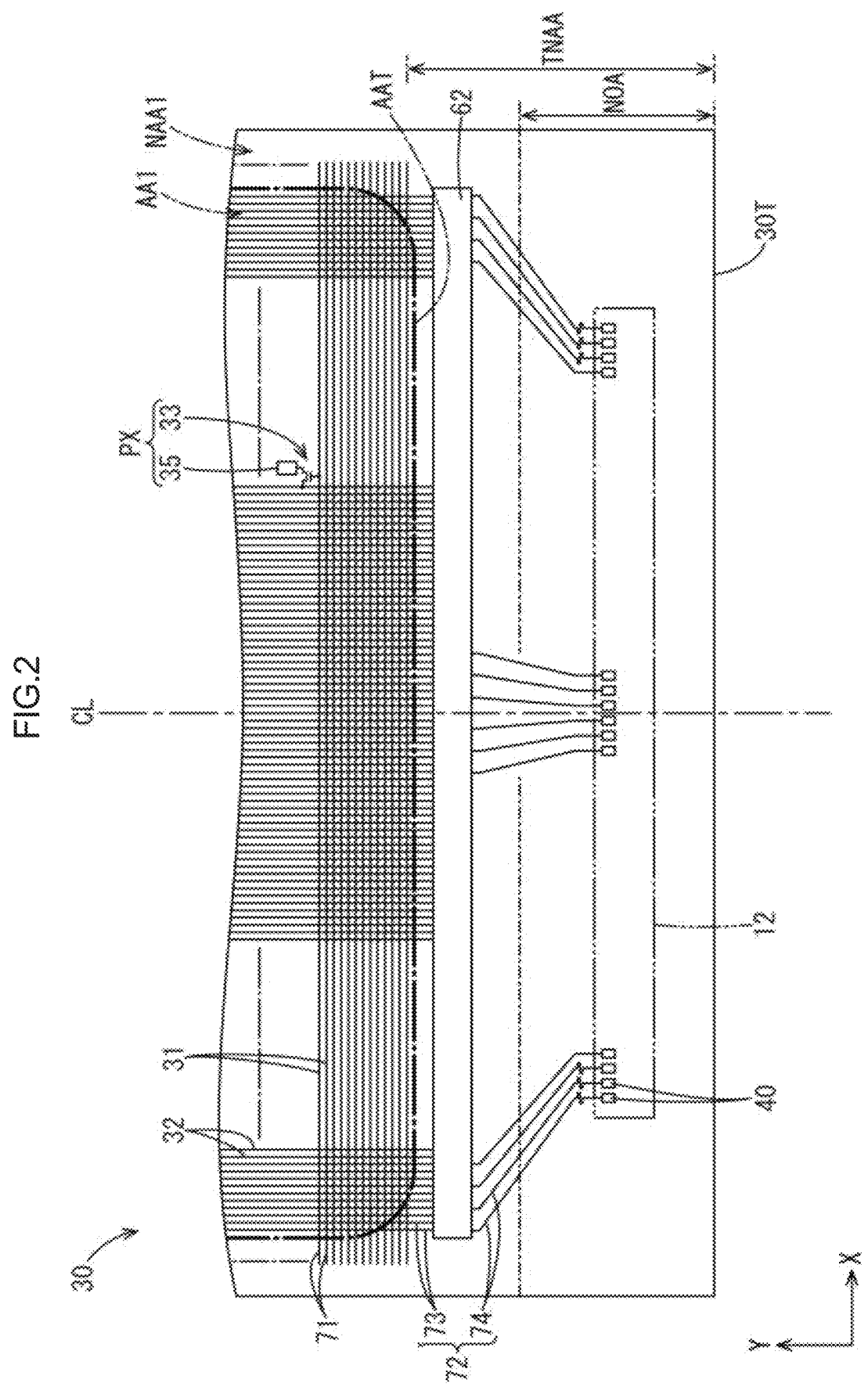
FIG. 2 is a schematic view illustrating a brief line structure near a terminal-side non-display area of an active matrix substrate.

Next, with reference to FIG. 2, structures within the display area AA1 of the liquid crystal panel 10 will be described. As illustrated in FIG. 2, on the inner surface side of the active matrix substrate 30 in the display area AA1, pixel electrodes 35 and pixel thin film transistors 33 (TFTs), which are switching components, and pixel electrodes 35 are arrayed in a matrix (in rows and columns) along the X-axis direction and the Y-axis direction. The pixel electrode 35 and the pixel TFT 33 configure a pixel PX that is a display unit of the liquid crystal panel 10. Gate lines 31 and source lines 32 (one example of pixel lines) that are perpendicular to each other are disposed to surround each of the pixel TFTs 33 and each of the pixel electrodes 35. The gate lines 31 extend in parallel to each other along the X-axis direction and are arranged at predefined intervals with respect to the Y-axis direction. The source lines 32 extend along the Y-axis direction and are arranged at predefined intervals with respect to the X-axis direction. The gate lines 31 and the source lines 32 are pixel lines that are connected to the pixels PX.

The gate lines 31 are sections of a first metal film (a first conductive film) that is formed of metal material with patterning on an inner surface of the light transmissive substrate. The source lines 32 are sections of a second metal film (a second conductive film) that is formed of metal material with patterning on an upper surface side (on an inner surface side) of the first metal film via an insulator. Each of the first metal film and the second metal film is a single-layer film formed of one of metal materials, such as copper, titanium, aluminum, molybdenum, and tungsten or a multi-layer film or an alloy formed of different kinds of the metal materials. The pixel TFT 33 includes a gate electrode 33G that is connected to the gate line 31, a source electrode 33S that is connected to the source line 32, a drain electrode 33D that is connected to the pixel electrode 35, and a channel section 33C that is connected to the source electrode 33S and the drain electrode 33D and made of semiconductor material. A structure of the pixel TFT 33 is substantially same as that of a driving TFT 63, which will be described later with reference to FIG. 6. Therefore, symbols for the components of the pixel TFT 33 are described with parentheses in FIG. 6. An amorphous silicon, an oxide semiconductor, or a low-temperature polycrystalline silicon may be used as the semiconductor material for the channel section 33C. The pixel electrode 35 is made of transparent electrode material such as ITO and is disposed on an area surrounded by the gate lines 31 and the source lines 32 and is connected to the pixel TFT 33 through a contact hole.

Color filters are disposed on the inner surface side of the counter substrate 20 in the display area AA1 to overlap the pixel electrodes 35, respectively. The color filters include three color filters that exhibit red (R), green (G), and blue (B). Further, a light blocking section (a black matrix) is disposed to define each of adjacent color filters. One of the counter substrate 20 and the active matrix substrate 30 includes a common electrode that is made of a transparent electrode material same as that of the pixel electrode 35 and is disposed to overlap the pixel electrodes 35.

The pixel TFT 33 and the pixel electrode 35 connected to the pixel TFT 33 included in the active matrix substrate 30 form the pixel PX. The pixel PX exhibits the color corresponding to the color filter R, G, or B opposed to the pixel electrode 35 in that pixel PX. If the pixel TFT 33 is driven based on a scanning signal that is supplied from the gate line 31 to the gate electrode 33G, a potential of an image signal (data signal) that is supplied from the source line 32 to the source electrode 33S is supplied to the drain electrode 33D via the channel section 33C. Thus, the pixel electrode 35 is charged with the potential of the image signal. When a predefined electric field is applied to the liquid crystal layer based on a potential difference created between the pixel electrode 35 and the common electrode, the orientation of the liquid crystals in the liquid crystal layer varies and the polarization of light transmitting through the liquid crystal panel 10 varies accordingly. An amount of the light transmitting through the liquid crystal panel 10 is controlled by each pixel PX. Through the control, an image in specified color is displayed in the display area AA1.

Next, with reference to FIGS. 1 to 3, structures of the liquid crystal panel 10 in the non-display area NAA1 will be described. In the following, as illustrated in FIG. 2, a lower short side of an outline of the display area AA1 (illustrated with a bold chain line in FIG. 2) is referred to as a terminal side AAT and a lower short side edge of the active matrix substrate 30 is referred to as a terminal-side edge 30T. In the first embodiment, the terminal side AAT and the terminal-side edge 30T extend along the X-axis and an area between the terminal side AAT and the terminal-side edge 30T is a terminal-side non-display area TNAA. In the terminal-side non-display area TNAA, an area between a line overlapping the lower edge of the counter substrate 20 (illustrated with a thin chain line in FIG. 2) and the terminal-side edge 30T is the substrate non-overlapping area NOA.

As illustrated in FIG. 2, in a driver 12 mount area (illustrated with a chain double-dashed line in FIG. 2) in the substrate non-overlapping area NOA, signal input terminals 40 (one example of a signal input section) are disposed. Output signals supplied from the driver 12 are input to the signal input terminals 40. The signal input terminals 40 are electrically and mechanically connected to the driver 12 with an anisotropic conductive film (ACF), for example. The signal input terminals 40 are arranged at predefined intervals along the X-axis direction, that is, a long-side direction (an arrangement direction of the source lines 32) of the driver 12. In the first embodiment section, all of the signal input terminals 40 are arranged in a line; however, the signal input terminals 40 may be arranged in a zig-zag pattern.

As illustrated in FIG. 1, in the non-display area NAA1 of the substrate overlapping area of the active matrix substrate 30 that overlaps the counter substrate 20, a row driving circuit 61 (a gate driver driving circuit) and a column driving circuit 62 (a source driver driving circuit, one example of a driving circuit) are disposed. The row driving circuit 61 is connected to the gate lines 31 disposed in the display area AA1 and the column driving circuit 62 is connected to the source lines 32. Each of the row driving circuit 61 and the column driving circuit 62 includes a control circuit that controls supply of output signals to the pixel TFTs 33 disposed in the display area AA1. Each circuit included in the row driving circuit 61 and the column driving circuit 62 is formed on the active matrix substrate 30 in a monolithic manner and is formed of a section of the semiconductor film made of an oxide semiconductor, the first metal film, and the second metal film as a base similar to each component included in the display area AA1.

As illustrated in FIG. 1, the row driving circuit 61 is disposed next to right and left long sides of an outline of the display area AA1 and is formed in a vertically-long substantially rectangular area extending along the Y-axis direction. In the first embodiment, two row driving circuits are disposed on the right and left sides, respectively; however, the row driving circuit may be disposed on one of the two sides. The row driving circuit 61 has a forming area in the Y-axis direction that is substantially same as that of the display area AA1 so as to be connected to all of the gate lines 31 by row connection lines 71, which will be described later. The row driving circuit 61 is configured to control driving of the gate lines 31 in the display area AA1 and includes a scanning circuit that is configured to supply a scanning signal included in the output signal supplied from the driver 12 to each gate line 31 at a certain timing and scan each gate line 31 sequentially. Specifically, the scanning circuit of the row driving circuit 61 is configured to scan the gate lines 31 as follows. The scanning circuit is configured to supply a control signal (scanning signal) from the driving circuit to the gate lines 31, which are arranged in parallel to the X-axis direction in the display area AA1, sequentially from the gate line 31 at one end position to the gate line 31 at another end position with respect to the Y-axis direction. The scanning circuit included in the row driving circuit 61 includes a buffer circuit that is connected to the gate lines 31 and amplifies the scanning signal and outputs the amplified scanning signal to the gate lines 31. The row driving circuit 61 may include an auxiliary circuit such as a level shifter circuit or an ESD protection circuit for protection from ESD.

As illustrated in FIG. 2, the column driving circuit 62 is disposed next to the terminal side AAT of the display area AA1 in the terminal-side non-display area TNAA and is formed in a laterally-long substantially rectangular area extending along the X-axis direction. Namely, the column driving circuit 62 is arranged between the terminal side AAT and a forming area of the signal input terminals 40 (a mount area of the driver 12) with respect to the Y-axis direction so as to be spaced therefrom in the terminal-side non-display area TNAA. As illustrated in FIGS. 1 and 2, the column driving circuit 62 has a forming area with respect to the X-axis direction substantially same as that of the display area AA1 so as to be connected to all of the source lines 32 by pixel-side column connection lines 73.

Figure 3:
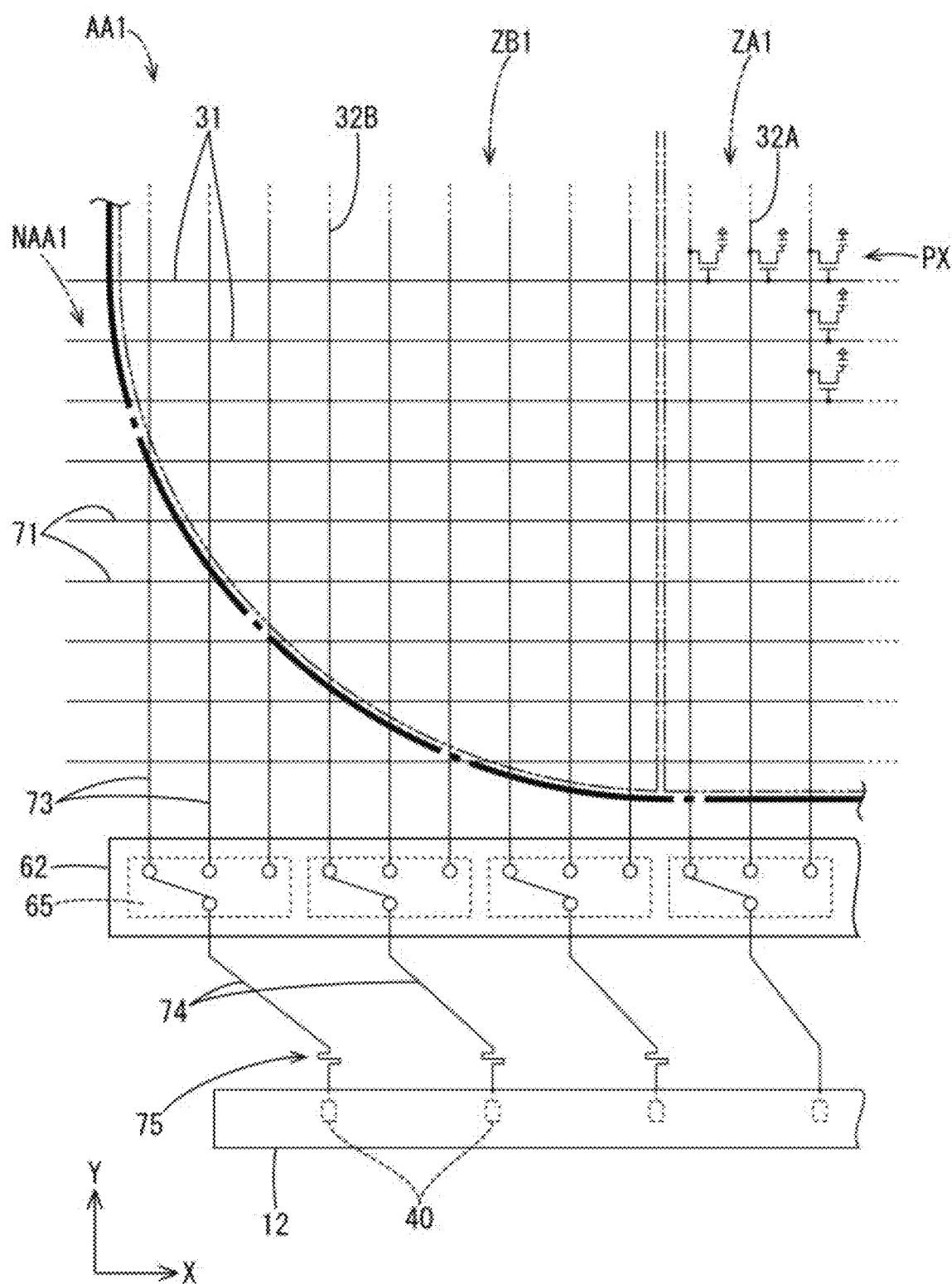
FIG. 3 is an enlarged schematic view illustrating a brief line structure near a corner section of a display area of the active matrix substrate.

As illustrated with being magnified in FIG. 3, the column driving circuit 62 includes connection switches 65 (an RGB switch, a sampling switch, an example of a load) that distribute image signals included in the output signals supplied from the driver 12 to corresponding one of the source lines 32. With such a selective driving type column driving circuit 62, the source lines are multiplexer-driven. In the multiplexer-driven column driving circuit 62, the number of the source lines 32 that are connected to one connection switch 65 is not particularly limited but may be any number n (n is a natural number of 1 or greater) and may be same as the number of the colors of the pixels PX, for example. As one example, the first embodiment includes the pixels PX of three colors including red, green and blue, and the three source lines 32 that are connected to the respective three pixel TFTs 33 of the pixels PX of the three colors are connected to one connection switch 65. In such a configuration, the source lines 32 are arranged in the X-axis direction within the display area AA1 and are connected to the respective pixel TFTs 33 of the pixels PX of red, green, and blue, respectively. The image signals supplied from the driver 12 side are distributed to the corresponding source line 32 of red, green, and blue by the connection switch 65 the column driving circuit 62. According to such a configuration, the number of input-side column connection lines 74, which will be described later, can be greatly reduced to one third of the number of the source lines 32 and this reduces an area necessary for the lines and also reduces a cost. The connection switch 65 includes a driving TFT 63 as a switching component, which will be described with reference to FIGS. 6 and 7A to 7E.

Next, with reference to FIGS. 2 to 4, a line structure from the signal input terminal 40 to the pixel line, particularly, a structure of a line path extending from the signal input terminal 40 to the source line 32 will be described. As illustrated in FIG. 2, on the terminal-side non-display area TNAA of the active matrix substrate, in addition to the signal input terminals 40 and the driving circuits 61, 62, connection lines such as row connection lines 71 and column connection lines 72 (one example of connection lines) are routed. The row connection lines 71 connect the signal input terminals 40 and the gate lines 31 via the row driving circuit 61 (not illustrated in FIG. 2). The column connection lines 72 connect the signal input terminals 40 and the source lines 32 via the column driving circuit 62. In the first embodiment, the signal input terminals 40, the column driving circuit 62, and the column connection lines 72 are arranged symmetrically with respect to the Y-axis at a middle of the active matrix substrate 30, namely, linearly symmetrical with respect to a center line CL along the Y-axis direction on the active matrix substrate 30. As illustrated in FIG. 3, the column connection lines 72 include pixel-side column connection lines 73 (one example of a pixel-side connection line) and input-side column connection lines 74 (one example of an input-side connection line and a connection line). The pixel-side column connection lines 73 connect the source lines 32 and the connection switches 65 of the column driving circuit 62. The input-side column connection lines 74 connect the signal input terminals 40 and the connection switches 65 of the column driving circuit 62.

As described earlier, the column driving circuit 62 has a forming area thereof in the X-axis direction that is substantially same as that of the display area AA1 (refer FIGS. 1 and 2). Therefore, the pixel-side column connection lines 73 extend substantially straight from the respective source lines 32 toward the column driving circuit 62. On the other hand, a forming area of the signal input terminals 40, that is, an X-axis dimension of a mounting area of the driver 12 is smaller than a length of the terminal side AAT. Therefore, the input-side column connection lines 74 are routed such that an outline of an entire routing area thereof is a fan-like shape and is narrowed from the column driving circuit 62 toward the signal input terminals 40. Therefore, line lengths of the input-side column connection lines 74 are varied according to the positions thereof and the lengths of the input-side column connection lines 74 become shorter in a stepwise manner as are closer to the middle section from the left and right sections.

As described earlier, the liquid crystal panel 10 in the first embodiment is a modified-shaped display panel and the display area AA1 has a shape different from a simple quadrangular shape. Specifically, the display area AA1 has four corners having an R shape. Therefore, some of the source lines 32 extending along the Y-axis in the display area AA1 have different line lengths according to the position thereof (an address) within the display area AA1. Details will be described below.

FIG. 4 schematically illustrates a structure of a whole line path extending from the signal input terminals 40 to the source lines 32 via the column driving circuit 62. In the active matrix substrate 30 in the first embodiment including the multiplexer-driven source lines 32, one of the three source lines 32 is selectively connected to each of the connection switches 65 included in the column driving circuit 62 in the first embodiment as is described with reference to FIG. 3. However, in FIG. 4, only one source line 32 is illustrated for every connection switch 65 and a part of the structure is not illustrated to prevent complication of the drawing. In the following, as illustrated in FIG. 4, the display area AA1 is divided into three sections by lines parallel to the Y-axis. The three sections include an A zone ZA1 and B zones ZB1. The A zone ZA1 is a middle portion of the display area AA1 and a rectangular area. The B zones ZB1 are left and right side portions of the display area AA1 and each area includes R-shaped corners. If the display area AA1 is defined into zones such that the area of the A zone ZA1 is largest as possible, the source lines 32A disposed in the A zone and the source lines 32B1, 32B2 disposed in the B zone have different line lengths. The number of pixels PX connected to the source lines is also different because no pixel PX is formed outside the display area AA1 and the pixel TFTs 33 and the pixel electrodes 35 are not disposed at intersections of the pixel-side column connection lines 73 and the column connection lines 71 that are disposed outside the display area AA1 (refer FIG. 3). Therefore, if the conventional line structure is included in the above structure, an electric resistance or a parasitic capacitance may differ between the source line 32A and the source lines 32B1, 32B2. Thus, if a charging potential $V_{px}$ of the pixel electrodes 35, that is, a writing potential of image data differs, luminance unevenness is caused in the pixels PX and this lowers display quality of images displayed on the entire display area AA1. Specifically, the line length of the source lines 32B1, 32B2 disposed in the B zone is shorter than the line length of the source line 32A disposed in the A zone. The source lines 32B1, 32B2 are short pixel lines compared to the source lines 32A. Compared to the source line 32A corresponding to other pixel line, the source lines 32B1, 32B2 corresponding to the short pixel lines have a shorter line length and a lower line resistance and also have a smaller number of pixels PX (line load) that are connected thereto. Therefore, an electric resistance of the source lines 32B1, 32B2 is smaller than an electric resistance of the source line 32A. Therefore, if the conventional line structure is applied to the line path including the above structure, a charging potential $V_{PXB0}$ of the pixels disposed in the B zone is generally higher than a charging potential $V_{PXA0}$ of the pixels disposed in the A zone. Thus, screen luminance is higher in the B zone ZB1 than in the A zone ZA1.

Further, as illustrated in FIG. 4, the line length and the number of connected pixels differ between the source line 32B1 and the source line 32B2 disposed in the B zone ZB1 and the source lines 32B1, 32B2 have small difference in an electric resistance and a parasitic capacitance. Specifically, the source line 32B2 that is disposed closer to an outer side (on an opposite side from the A zone) in the B zone has a shorter line length and the smaller number of pixels connected thereto (in this configuration, the source line 32B2 corresponds to the short pixel line and the source line 32B1 corresponds to other pixel line) compared to the source line 32B1 that is disposed closer to a middle section (closer to the A zone) in the B zone. Therefore, luminance unevenness is caused within the B zone ZB1.

Figure 7A:
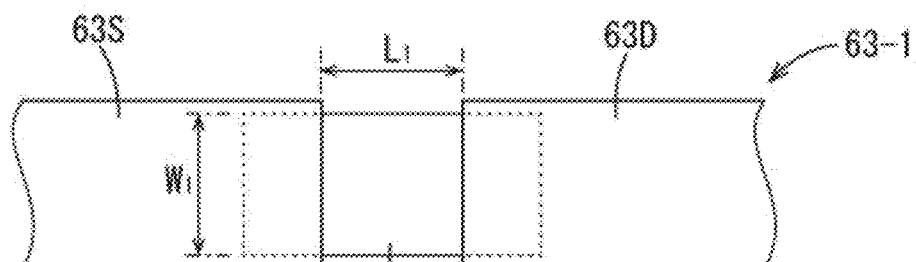
FIG. 7A is a schematic view illustrating a brief planar structure of a reference TFT.
Figure 7B:
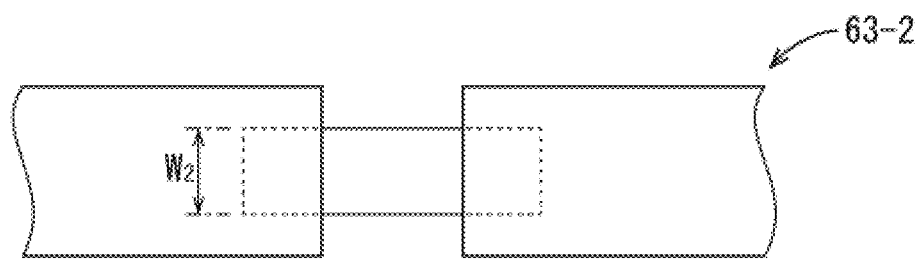
FIG. 7B is a schematic view illustrating a brief planar structure of a TFT having a reduced channel width.
Figure 7C:
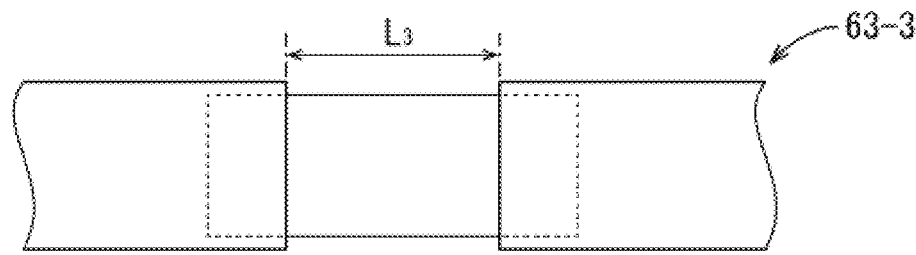
FIG. 7C is a schematic view illustrating a brief planar structure of a TFT having an increased channel width.
Figure 7D:
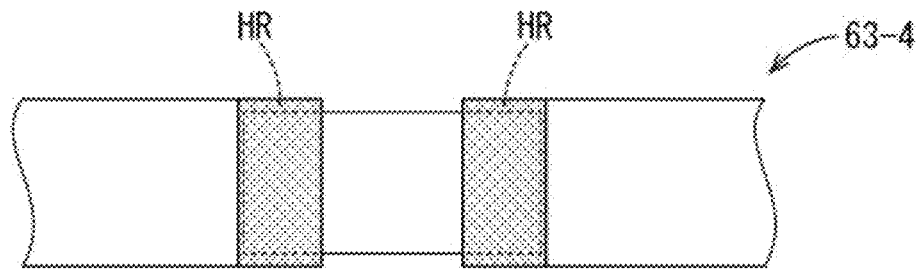
FIG. 7D is a schematic view illustrating a brief planar structure of a TFT including a high resistance area in an electrode section.
Figure 7E:
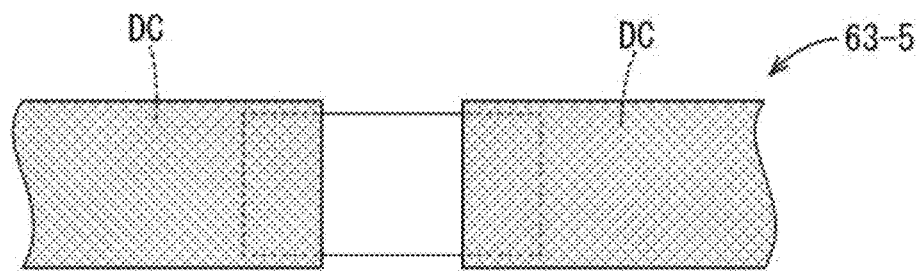
FIG. 7E is a schematic view illustrating a brief planar structure of a TFT including a doping amount changed area in an electrode section.

In the active matrix substrate 30 of the first embodiment, ON resistance values of the connection switches 65 included in the column driving circuit 62 are varied in a stepwise manner. More in detail, a structure of the driving TFT 63 included in the connection switch 65 is changed to adjust the ON resistance value. In the following, details will be described with reference to FIG. 6 and FIGS. 7A to 7E. The driving TFT 63 has a structure that is similar to that of the pixel TFT 33. As illustrated in FIG. 6, the driving TFT 63 includes a gate electrode 63G that is a section of the first metal film or the second metal film, a source electrode 63S, a drain electrode 63D, and a channel section 63C that is a section of the oxide semiconductor. FIGS. 7A to 7E schematically illustrate a brief planar structure of the driving TFT 63. FIG. 7A illustrates a reference TFT 63-1 that is an example of the driving TFT 63 and a reference one. FIGS. 7B to 7E illustrate specific examples of the driving TFTs 63 included in the connection switches 65 having various different ON resistance values. For example, a TFT 63-2 illustrated in FIG. 7B is designed to have a channel width W2 smaller than a channel width W1 of the reference TFT 63-1. As a result, electrons are less likely to move from the source electrode 63S to the drain electrode 63D and driving ability is lowered. The ON resistance value of the connection switch 65 including the TFT 63-2 is higher than the ON resistance value of the connection switch 65 including the TFT 63-1. A TFT 63-3 illustrated in FIG. 7C is designed to have a channel length L3 greater than a channel length L1 of the reference TFT 63-1. As a result, the ON resistance value of the connection switch 65 including the TFT 63-3 becomes higher similar to the TFT 63-2. A TFT 63-4 illustrated in FIG. 7D includes a high resistance area HR in the source electrode 63S and the drain electrode 63D so that the ON resistance value of the connection switch 65 including the TFT 63-4 becomes higher. A TFT 63-5 illustrated in FIG. 7E includes a doping amount changed area DC in the source electrode 63S and the drain electrode 63D. The amount of impurity ions included in the doping amount changed area DC is different from the amount of impurity ions included in the reference TFT 63-1. Thus, the ON resistance value of the connection switch 65 including the TFT 63-5 with such electrodes can be changed (for example, increased) by including the doping amount changed area DC. FIGS. 7B to 7E illustrate examples of structure designs of the driving TFTs 63 and means of adjusting the ON resistance values of the connection switches 65 is not limited thereto. The ON resistance value of the connection switch 65 may be adjusted by combining the structures of the examples.

To change the ON resistance value of the connection switch 65 as described earlier, the design of the driving TFT 63 included in the connection switch 65 is necessarily changed and this requires time and cost. Therefore, in actual use, different kinds of driving TFTs 63 that have stepwise different ON resistance values are prepared and an appropriate one of the driving TFTs 63 is disposed in the connection switch 65 of each line according to an electric resistance of each source line 32. For example, FIG. 4 illustrates the active matrix substrate 30 where three kinds of connection switches 65A, 65B, 65C are arranged. The relation of the ON resistance values of the connection switches 65 is as follows: the connection switch 65A<the connection switch 65B<the connection switch 65C (the connection switch 65 is illustrated with a smaller size in FIG. 4 as the ON resistance value becomes greater). The connection switch 65A having a small ON resistance value is disposed for the source line 32A having a relatively large electric resistance and the connection switch 65B having an ON resistance value greater than that of the connection switch 65A is disposed for the source line 32B1 having an electric resistance smaller than that of the source line 32A. The connection switch 65C having an ON resistance value greater than that of the connection switch 65B is disposed for the source line 32B2 having an electric resistance smaller than that of the source line 32B1. Namely, the connection switch 65 having a greater ON resistance value is connected to the source line 32 having a shorter line length and a smaller electric resistance. Thus, provided with the different kinds of connection switches 65 having different ON resistance values, the electric resistance of each of the line paths extending from the signal input terminals 40 to the source lines 32 via the column driving circuit 62 as a whole can be adjusted in a stepwise manner to approximate the electric resistances of each line path. However, as described earlier, it is not practical to adjust the ON resistance values of the connection switches 65 finely. Therefore, it is difficult to uniform the electric resistances of the line paths that vary in a continuous and irregular manner in modified-shaped display panels having various shapes only with the above method with high accuracy. For example, FIG. 4 illustrates a configuration as follows. The electric resistance of one of a partial line path including the source line 32B1 [the connection switch 65B+the pixel-side column connection line 73+the source line 32B1] and a partial line path including the source line 32B2 [the connection switch 65C+the pixel-side column connection line 73+the source line 32B2] is smaller than the electric resistance of a partial line path including the source line 32A [the connection switch 65A+the pixel-side column connection line 73+the source line 32A] (in this configuration, in the partial line path including one of the source lines 32B1, 32B2, if the connection switch 65 having a second largest ON resistance value subsequent to the ON resistance value of the connection switch 65B, 65C is disposed instead of the connection switch 65B, 65C, the electric resistance of each partial line path exceeds the electric resistance of the partial line path including the source line 32A).

Figure 5A:
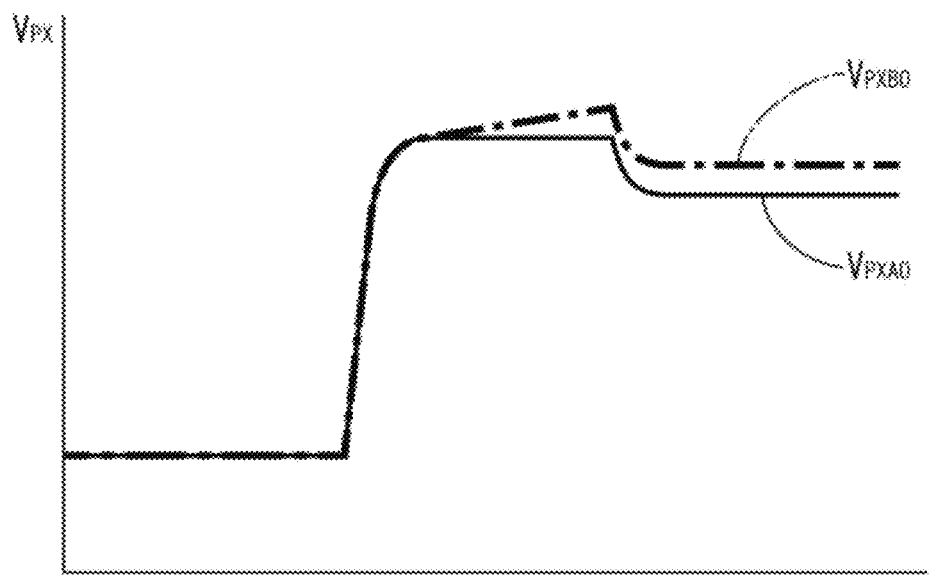
FIG. 5A is a graph representing charging potentials of a pixel electrode included in a modified-shaped liquid crystal panel including a conventional line structure.
Figure 5B:
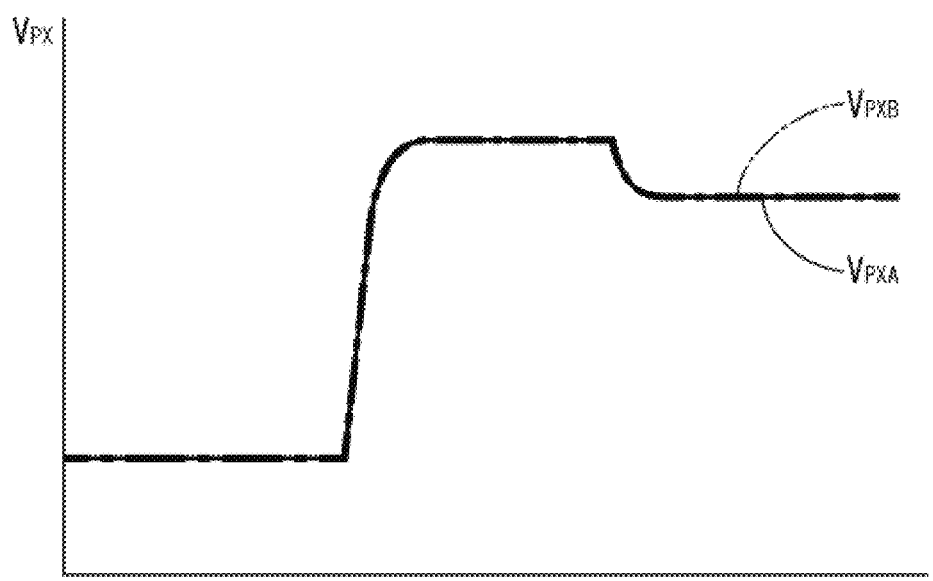
FIG. 5B is a graph representing charging potentials of a pixel electrode included in the liquid crystal panel of the first embodiment.

In the active matrix substrate 30 in the first embodiment, the input-side column connection line 74 includes a redundant line section 75 (one example of a line resistance adjusting section). The redundant line section 75 is an extra section that increases a line length further than a required length and may have any length. The line resistance of the input-side column connection line 74 can be finely adjusted easily by providing the redundant line section 75 having a length according to the electric resistance of the source line 32 connected thereto. In the configuration illustrated in FIG. 4, each of the input-side column connection lines 74B1, 74B2 that are connected to the respective source lines 32B1, 32B2 in the B zone includes the redundant line section 75. Accordingly, the electric resistance of each of the line paths including the redundant line sections 75 [the input-side column connection line 74B1 (including the redundant line section 75)+the connection switch 65B+the pixel-side column connection line 73+the source line 32B1], [the input-side column connection line 74B2 (including the redundant line section 75)+the connection switch 65C+the pixel-side column connection line+the source line 32B2] is increased and becomes substantially equal to the electric resistance of the line path including the source line 32A in the A zone [the input-side column connection line 74A+the connection switch 65A+the pixel-side column connection line 73+the source line 32A]. In this configuration, the input-side column connection line 74A that is connected to the source line 32A in the A zone does not include the redundant line section 75. The input-side column connection line 74B1 and the input-side column connection line 74B2 include the redundant line sections 75, respectively, that have a substantially same shape (length). However, the redundant line section 75 is not necessarily limited to such a configuration. In addition to or instead of the input-side column connection line 74B1 and the input-side column connection line 74B2, the input-side column connection line 74A may include the redundant line section 75. The input-side column connection line 74B1 and the input-side column connection line 74B2 (and the input-side column connection line 74A) may include the redundant line sections 75 having different shapes (lengths). The electric resistance of each of the line paths as a whole can be uniformed with high accuracy by adjusting the length of the redundant line section 75 finely. FIG. 5B illustrates relations of a charging potential $V_{PXB}$ of the pixels in the B zone and a charging potential $V_{PXA}$ of the pixels in the A zone in the liquid crystal panel 10 of the first embodiment including the above-described structure. The ON resistance value of the connection switch 65 is adjusted and the input-side column connection line 74 includes the redundant line section 75 such that the electric resistance of each line path extending from the signal input terminal 40 to the source line 32 as a whole can be uniformed with high accuracy. Accordingly, the charging potential $V_{PXB}$ of the pixels disposed in the B zone is substantially equal to a charging potential $V_{PXA}$ of the pixels disposed in the A zone. A gap that is created between the charging potential $V_{PXB0}$ and the charging potential $V_{PXA0}$ in FIG. 5A becomes smaller and charging unevenness is less likely to be caused.

As described above, the active matrix substrate 30 in the first embodiment includes the source lines 32 (the pixel lines), the signal input terminals 40 (the signal input section), and the column connection lines 72 (the connection lines). The source lines 32 are disposed within the display area AA1 including the pixels PX therein and are connected to the pixels PX. The signals are input to the source lines 32 via the signal input terminals 40. The column connection lines are connected to the signal input terminals 40 and the source lines 32. The source lines 32 include the source lines 32B1, 32B2 (the short pixel lines) that have a line length smaller than that of the source line 32A (the other pixel line). Among the input-side column connection lines 74 included in the column connection lines 72, one of the input-side connection line 74B1, 74B2 (the short pixel connection line) connected to the source line 32B1, 32B2 or the input-side column connection line 74A (other connection line) connected to the source line 32A includes the redundant line section 75 (the line resistance adjusting section) that adjusts the line resistance of the input-side column connection line 74 according to the electric resistance of the source line 32 that is connected to the input-side column connection line 74.

According to the configuration of the first embodiment, the line resistance of the input-side column connection line 74 (eventually, the column connection line 72) is adjusted by the redundant line section 75. Accordingly, the electric resistance of each line path extending from the signal input terminal 40 to a distal end of the source line 32 [the input-side column connection line 74 (including the redundant line section 75)+the connection switch 65+the pixel-side column connection line 73+the source line 32] can be set to a desired value. The electric resistance of the line path extending from the signal input terminal 40 to the source line 32B1, 32B2 (the short pixel line) via the input-side column connection line 74B1, 74B2 (the short pixel connection line) is set equal to the electric resistance of the line path extending from the signal input terminal 40 to the source line 32A (other pixel line) via the input-side column connection line 74A (other pixel connection line). Accordingly, in the liquid crystal panel 10 (the display panel) including the short pixel line, the charging potential $V_{PX}$ of the pixels can be uniformed and the luminance unevenness is not caused and image display quality can be improved. In some cases, screen luminance in a specific area of the display area AA1 is changed such that a part of the screen can be made brighter (darker). The redundant line section 75 is provided not to change a resistance of the load (such as a circuit component) that is connected to each line path but to change a line resistance of the input-side column connection line 74. Therefore, with the redundant line section 75, the resistance can be adjusted easily without changing the design of the circuit or the circuit component or increasing the number of parts or the number of steps. Therefore, the electric resistance of each line path as a whole can be set finely. As a result, the charging potential $V_{PX}$ of each pixel PX can be uniformed with high accuracy. The present technology is particularly effective to improve image display quality in the modified-shaped display panel in which the electric resistance of the source lines 32 varies in a continuous and irregular manner like the liquid crystal panel 10 having the R-shaped corners in the first embodiment. In the first embodiment, the active matrix substrate 30 that includes the connection switch 65 (the load) on the column connection line 72 (the connection line) includes the line resistance adjusting section 75 and the different kinds of connection switches 65 having the different ON resistance values. However, in the active matrix substrate having the similar configuration, only one kind of connection switch may be used and the electric resistance may be uniformed only by the line resistance adjusting section.

In the active matrix substrate 30 of the first embodiment, the redundant line section 75 corresponds to the line resistance adjusting section. According to such a configuration, the input-side column connection line 74B1, 74B2 includes a simple structure of the redundant line section 75 so that the line resistance of the input-side column connection line 74B1, 74B2 can be adjusted and the electric resistance of each line path extending from the signal input terminal 40 to the source line 32 can be set to a desired value. The line resistance can be adjusted only by changing the length of the redundant line section 75 as appropriate. Therefore, the line resistance can be adjusted finely with high accuracy.

In the active matrix substrate 30 of the first embodiment, the input-side column connection lines 74B1, 74B2 (the short pixel connection line) include the respective connection switches 65B, 65C that have a resistance greater than that of the connection switch 65A (the load) disposed on the input-side column connection line 74A (other connection line). According to such a configuration, after the resistances of the connection switches 65 disposed on the column connection lines 72 are changed to briefly adjust the electric resistance of each column connection line 72, the line resistance of each column connection line 72 can be adjusted finely by the redundant line section 75. Accordingly, the line resistance adjusting section required for adjusting the electric resistance with high accuracy for the whole line path extending from the signal input terminal 40 to the distal end of the source line 32 can be made smaller (the redundant line section 75 can become shorter). As a result, a space necessary for disposing the line resistance adjusting section or an area of the non-display area NAA1 can be reduced to achieve reduction in a frame width of the liquid crystal panel 10 (in other words, the present technology can be applied to a narrow frame display panel that cannot have a space for disposing the long redundant line section 75, for example). In such a configuration, it is necessary to only prepare different kinds of connection switches 65A, 65B, 65C having different ON resistance values for the connection switches 65 disposed on the column connection lines 72. Therefore, precise design change is not necessary and increase of the number of parts can be at a certain degree.

In the active matrix substrate 30 of the first embodiment, the column driving circuit (the driving circuit) 62 for driving the source lines 32 is disposed on the column connection lines 72. The column connection lines 72 (the connection lines) include the input-side column connection lines 74 (the input-side connection lines) and the pixel-side column connection lines 73 (the pixel-side connection lines). The input-side column connection lines 74 are connected to the signal input terminals 40 and the column driving circuit 62. The pixel-side column connection lines 73 are connected to the column driving circuit 62 and the source lines 32. The column driving circuit 62 includes the connection switches 65 that connect the input-side column connection lines 74 and the pixel-side column connection lines 73. The connection switches 65 include the connection switches 65B, 65C (the short pixel connection switch) that are connected to the source line 32B1 (the short pixel line) and the connection switch 65A (other connection switch) that is connected to the source line 32A (other pixel line). The ON resistance value of the connection switches 65B, 65C is higher than the ON resistance value of the connection switch 65A. According to such a configuration, in the liquid crystal panel 10 including the column driving circuit 62 (that corresponds to one example of the loads provided on the connection lines) that drives the source lines 32, the above-described effects are obtained by changing the ON resistance value of the connection switch 65 included in the column driving circuit 62. The column driving circuit 62 of the liquid crystal panel 10 includes the connection switches 65 that selectively connect one of the source lines 32 to one signal input terminal 40, and the source lines 32 are configured to be multiplexer-driven. In such a liquid crystal panel 10, the non display area NAA1 likely to be demanded to be small (reduction in the frame width) and therefore, the present technology is particularly effective. The ON resistance value of the connection switch 65 including the driving TFT 63 can be adjusted by changing a length or a width of the channel section 63C of the driving TFT 63, forming the high resistance area HR or a low resistance area in the source electrode 63S and the drain electrode 63D, or changing a density of impurity ions that are doped in the source electrode 63S and the drain electrode 63D.

The liquid crystal panel 10 (the display panel) in the first embodiment includes the above-described active matrix substrate 30 and the counter substrate 20 that is opposed to and bonded to the active matrix substrate 30. According to such a configuration, the liquid crystal panel 10 (the display panel), particularly a modified-shaped display panel, having less luminance unevenness is obtained.

Second Embodiment

A second embodiment will be described with reference to FIGS. 8 and 9. In a liquid crystal panel 210 of the second embodiment, the source lines 32 are not configured to be multiplexer-driven. The liquid crystal panel 210 differs from the liquid crystal panel 10 in the first embodiment in that the signal input terminals 30 are directly connected to the source lines 32 by column connection lines 272A, 272B1, 272B2. In the following, the same symbols are provided to configurations of the liquid crystal panel 210 similar to the configurations of the liquid crystal panel 10 in the first embodiment and operations and effects thereof will not be described (same in third and fourth embodiments).

Figure 9:
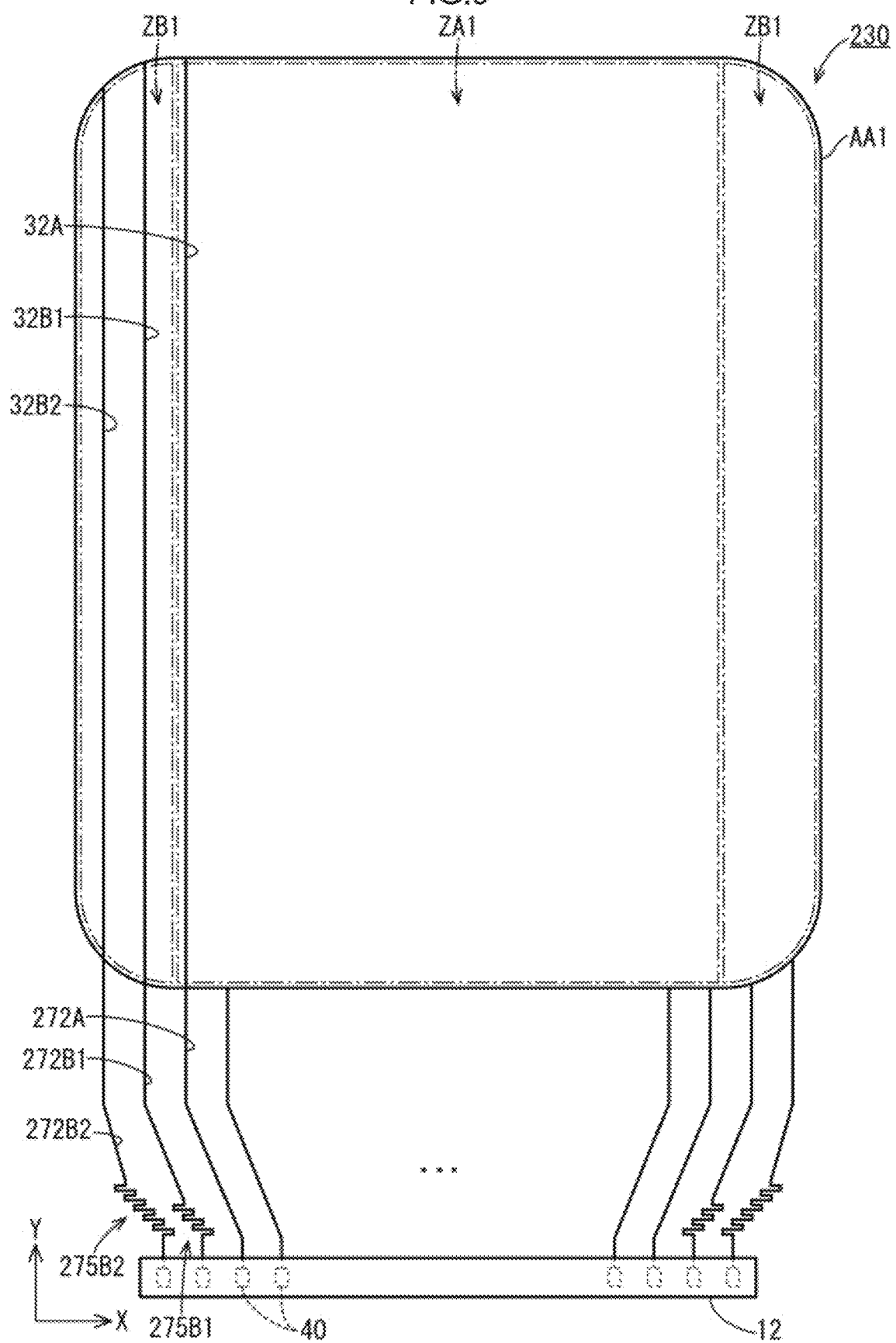
FIG. 9 is a planar schematic view illustrating a brief line structure of the liquid crystal panel.

The liquid crystal panel. 210 having a brief planar structure illustrated in FIG. 8 includes an active matrix substrate 230 illustrated in FIG. 9. The active matrix substrate 230 does not include a column driving circuit and the signal input terminals 40 are directly connected to the source lines 32A, 32B1, 32B2 by the column connection lines 272A, 272B1, 272B2, respectively. Namely, in the active matrix substrate 230 of the second embodiment, any of the column connection lines 272A, 272B1, 272B2 does not have a load, which corresponds to the connection switch 65 in the first embodiment. The column connection line 272B1 that is connected to the source line 32B1 includes a redundant line section 275B1 and the column connection line 272B2 that is connected to the source line 32B2 includes a redundant line section 275B2. The redundant line section 275B1 of the column connection line 272B1 is longer than the redundant line section 75 in the first embodiment and the redundant line section 275B2 of the column connection line 272B2 is longer than the redundant line section 275B1. In the second embodiment, the electric resistance of each line path is uniformed only by the redundant line sections 275B1, 275B2.

According to the configuration of the second embodiment, the redundant line sections 275B1, 275B2 of appropriate lengths are included such that the connection lines 272B1, 272B2 have an appropriate line resistance. With such a simple configuration, luminance unevenness within the display area AA1 of the liquid crystal panel 210 is less likely to be caused and image quality can be improved. Such a configuration can be applied to the active matrix substrate 230 having no load on the connection line. Namely, the technology described in Japanese Unexamined Patent Application Publication No. 2007-41229 can be applied only to an active matrix substrate including a source line driving circuit (a load) with switches on the connection line. The present technology can be widely applied to active matrix substrates of various configurations.

Third Embodiment

A third embodiment will be described with reference to FIGS. 10 and 11. A liquid crystal panel 310 in the third embodiment differs from the liquid crystal panel 10 in the first embodiment as follows. An active matrix substrate 330 of the liquid crystal panel 310 includes a display area AA3 having a modified shape that is different from a shape of the display area AA1. The active matrix substrate 330 includes a different resistance section as the line resistance adjusting section instead of the redundant line section 75. An electric resistance caused in a unit distance portion of the different resistance section is different from an electric resistance caused in a unit distance portion of another section.

Figure 10:
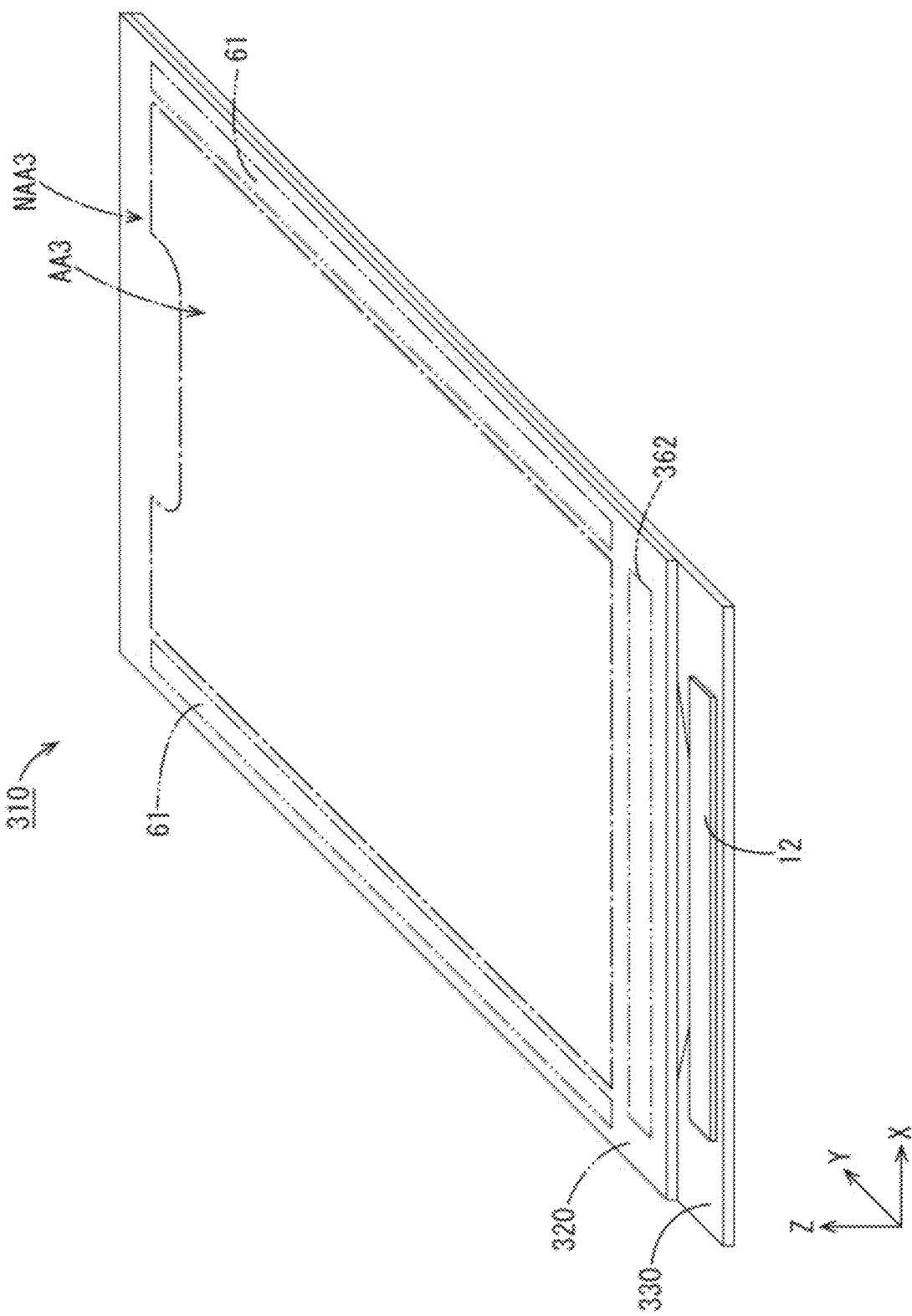
FIG. 10 is a perspective view illustrating a brief structure of a liquid crystal panel according to a third embodiment.

As illustrated in FIG. 10, the liquid crystal panel 310 in the third embodiment includes the active matrix substrate 330 and a counter substrate 320, and the display area AA3 is formed in a rectangular shape having a recessed section at an upper middle section with respect to a right-left direction. The row driving circuit 61 is disposed on right and left sides of the display area AA3 and in a non-display area NAA3. A column driving circuit 362 including connection switches 365A, 365B, 365C (refer FIG. 11), which will be described later, is disposed below the display area AA3 and in the non-display area NAA3. FIG. 11 is a drawing corresponding to FIG. 4 in the first embodiment. FIG. 11 schematically illustrates a structure of a line path as a whole extending from the signal input terminal 40 to each of the source lines 332A, 332B1, 332B2 disposed in the display area AA3 via the column driving circuit 362. As illustrated in the drawing, the display area AA3 is divided into three sections by lines parallel to the Y-axis. The three sections include A zones ZA3 and a B zone ZB3. The A zones ZA3 are left and right side rectangular areas of the display area AA3. The B zone ZB3 is a middle of the display area AA3 including a recessed section. The source lines 332B1, 332B2 disposed in the B zone has a line length shorter than that of the source line 332A disposed in the A zone and the number of pixels (line load) connected to the source lines 332B1, 332B2 is smaller than that connected to the source line 332A. Thus, an electric resistance related to the source lines 332B1, 332B2, which correspond to the short pixel lines, is smaller than an electric resistance related the source line 332A, which corresponds to other pixel line. A line length of the source lines 332B2 disposed closer to a middle portion of the B zone ZB3 (opposite side from the A zones AZ3) is shorter than a line length of the source line 332B1 disposed closer to an outer portion of the B zone ZB3 (closer to the A zone ZA3). The number of pixels connected to the source line 332B2 is smaller than that of pixels connected to the source line 332B1 (in this configuration, the source line 332B2 corresponds to the short pixel line and the source line 332B1 corresponds to other pixel line). Therefore, if the conventional connection structure is applied to the above structure, luminance is generally higher in the B zone ZB3 than in the A zone ZA3 and luminance is higher at the middle portion within the B zone ZB3 and luminance unevenness may be caused.

Figure 11:
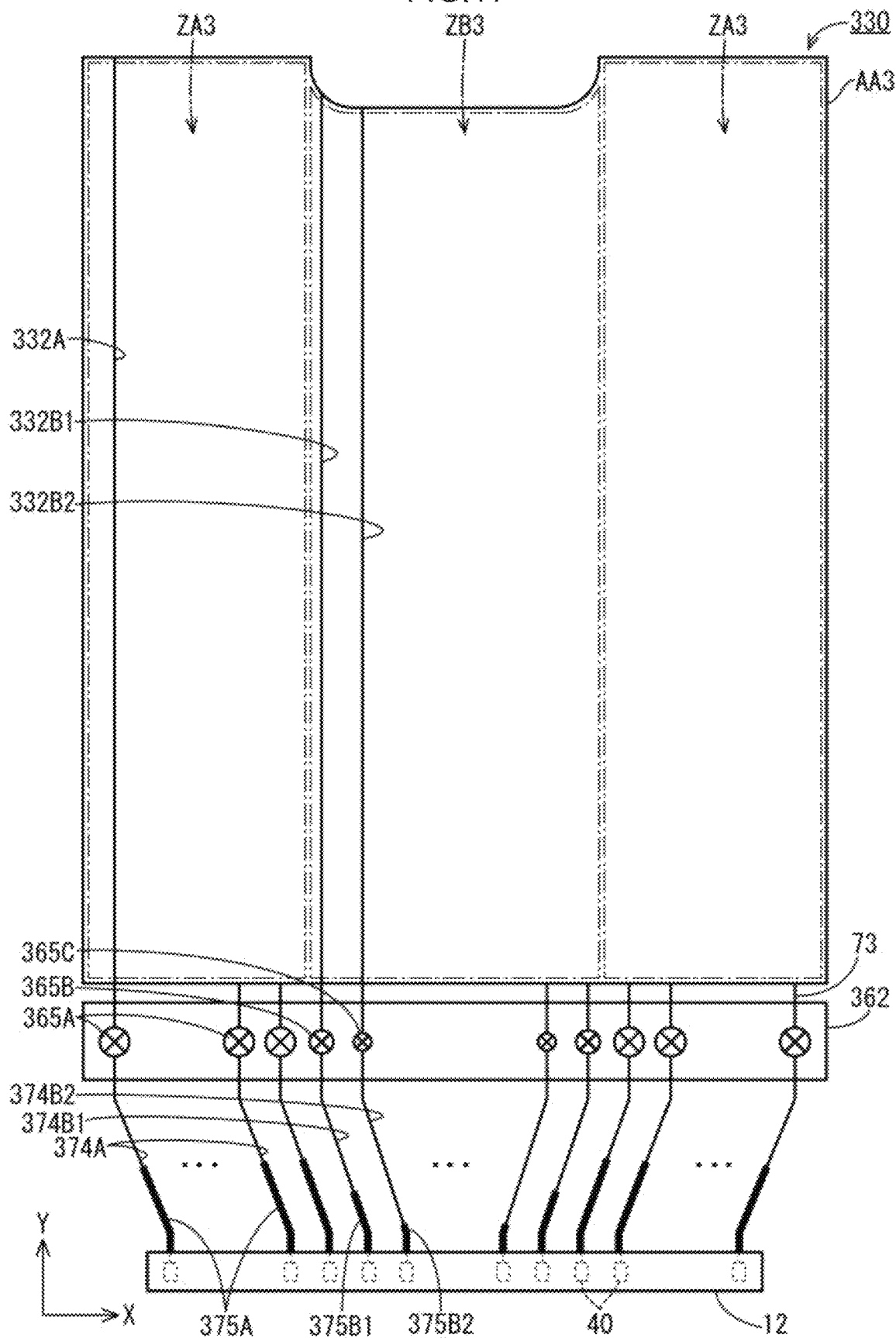
FIG. 11 is a planar schematic view illustrating a brief line structure of the liquid crystal panel.

As illustrated in FIG. 11, also in the third embodiment, the column driving circuit 362 includes three kinds of connection switches 365A, 365B, 365C. The relation of the ON resistance values of the connection switches is as follows: the connection switch 365A<the connection switch 365B<the connection switch 365C. The connection switch 365A having a small ON resistance value is disposed for the source line 332A having a relatively large electric resistance and the connection switch 365B having an ON resistance value greater than that of the connection switch 365A is disposed for the source line 332B1 having an electric resistance smaller than that of the source line 332A. The connection switch 365C having an ON resistance value greater than that of the connection switch 365B is disposed for the source line 332B2 having an electric resistance smaller than that of the source line 332B1.

In the third embodiment, input-side column connection lines 374A, 374B1, 374B2 include large cross sectional area sections 375A, 375B1, 375B2 (one example of the different resistance section and the line resistance adjusting section), respectively. The large cross sectional area section of the line has a cross sectional area that is larger than a cross sectional area of other portion thereof. The line resistance is smaller at the large cross sectional area sections 375A, 375B1, 375B2 than other portions. Each of the large cross sectional area sections 375A, 375B1, 375B2 is easily formed by increasing a line width of a portion of each of the input-side column connection lines 374A, 374B1, 374B2 and a length of each large cross sectional area section 375A, 375B1, 375B2 is easily adjusted as appropriate. For example, in addition to disposing the connection switches 365A, 365B, 365C having a relatively large ON resistance value, a line width of a portion of the input-side column connection lines 374A, 374B1, 374B2 each having a necessary length is increased as appropriate to finely adjust the electric resistance so as to become smaller. The lengths of the large sectional area sections 375A, 375B1, 375B2 are adjusted as follows. The electric resistance of each of the line paths including the source lines 332B1, 332B2 in the B zone [the input-side column connection line 374B1 (including the large cross sectional area section 375B1)+the connection switch 365B+the pixel-side column connection line 73+the source line 332B1] and [the input-side column connection line 374B2 (including the large cross sectional section 375B2)+the connection switch 365C+the pixel-side column connection line 73+the source line 332B2] becomes substantially equal to the electric resistance of the line path including the source line 332A in the A zone [the input-side column connection line 374A (including the large sectional area section 375A)+the connection switch 365A+the pixel-side column connection line 73+the source line 332A]. According to such adjustment, the electric resistance of each line path as a whole is uniformed with high accuracy and the charging potential $V_{PX}$ of each pixel is substantially same regardless of its address and charging unevenness is less likely to be caused.

The active matrix substrate 330 in the third embodiment includes the large cross sectional area section (one example of the different resistance section) as the line resistance adjusting section. The large cross sectional area section has an electric resistance value in a unit distance portion that is lower than an electric resistance in a unit distance portion of other portion. According to such a configuration, even if the display panel has a small non-display area NAA3 and has no space for disposing the redundant line section, the line resistance of each of the input-side column connection lines 374A, 374B1, 374B2 (one example of the connection lines) can be easily adjusted with high accuracy and with a simple structure. The third embodiment includes the large cross sectional area sections 375A, 375B1, 375B2 that have a greater line width and a greater large cross sectional area than other portions as the different resistance section. However, the different resistance section is not limited thereto but may be a high resistance section that has a smaller line width and a smaller cross sectional area than other portions. The different resistance section may be formed by changing a line height of a portion of the connection line. In the third embodiment, the line resistance of each of the input-side column connection lines 374A, 374B1, 374B2 is adjusted by changing a length of each of the large cross sectional area sections 375A, 375B1, 375B2; however, it is not limited thereto. For example, the line widths of the different resistance sections may be changed to adjust the line resistance.

Fourth Embodiment

A fourth embodiment will be described with reference to FIGS. 12 and 13. A liquid crystal panel 410 in the fourth embodiment differs from the liquid crystal panel 10 in the first embodiment in the following configuration. An active matrix substrate 430 of the liquid crystal panel 410 includes a display area AA4 having a modified shape different from that of the display area AA1 and includes the following different resistance section instead of the redundant line section 75 as the line resistance adjusting section. The different resistance section in the fourth embodiment has an electric resistance in a unit distance portion thereof that is different from an electric resistance in a unit distance portion of other portion. The signal input terminals 40 from which image signals are input to the source lines are not disposed in a middle section of a driver 412 mounting area with respect to the right and left direction (no terminals is formed in the middle section of the mounting area or terminals in the middle section may be used for other objective).

Figure 12:
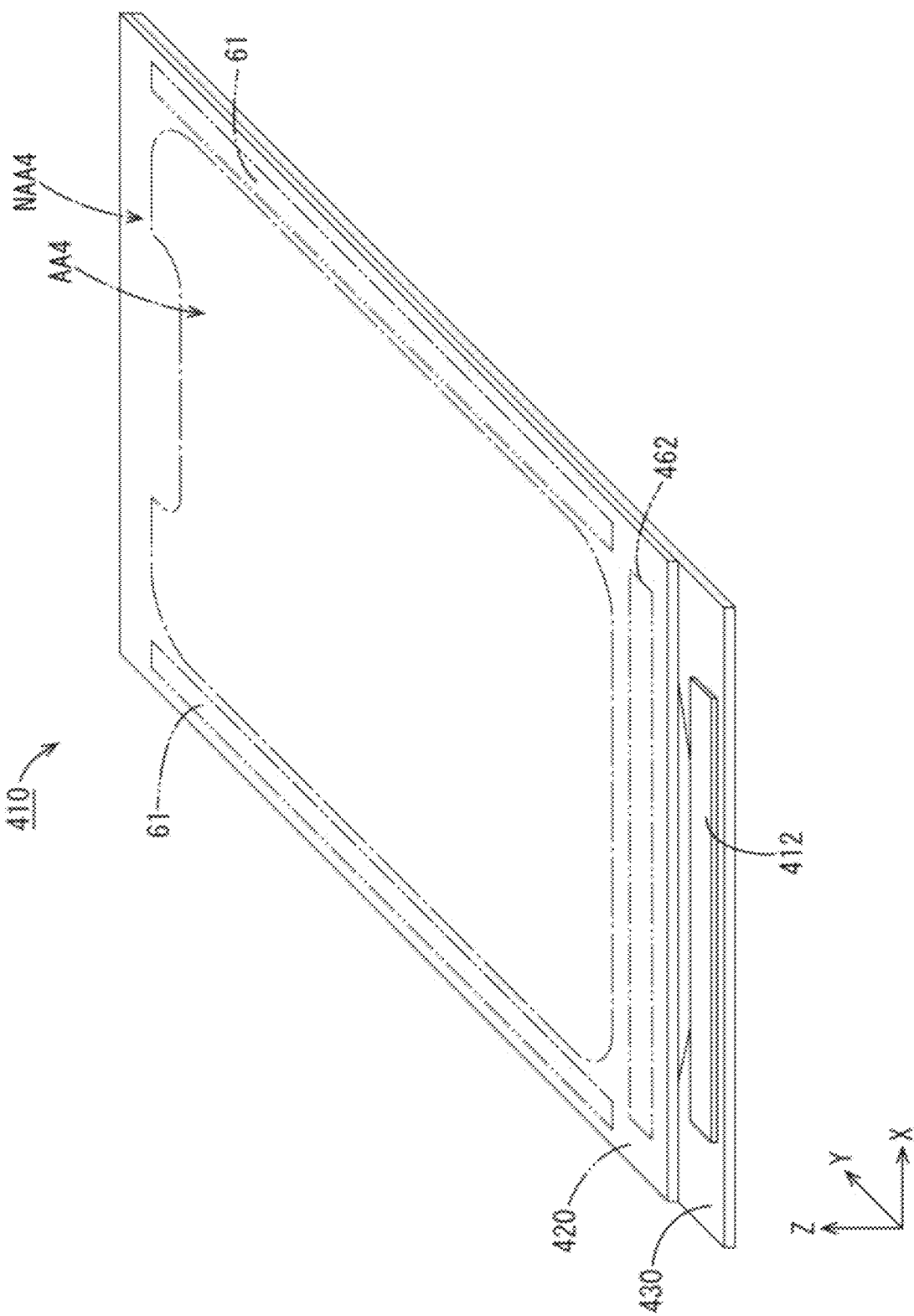
FIG. 12 is a perspective view illustrating a brief structure of a liquid crystal panel according to a fourth embodiment.

As illustrated in FIG. 12, the liquid crystal panel 410 in the fourth embodiment includes the active matrix substrate 430 and a counter substrate 420. The display area AA4 has a recessed section at an upper middle section thereof with respect to the left and right direction. Further, the display area AA4 has four corners that are chamfered in an R-shape. The row driving circuit 61 is disposed on the right and left sides of the display area AA4 and in the non-display area NAA4. A column driving circuit 462 including connection switches 465A, 465B, 465C, which will be described later, is disposed below the display area AA4. FIG. 13 corresponds to FIG. 4 of the first embodiment and schematically illustrates a configuration of a whole line path extending from the signal input terminals 40 to the respective source lines 432A, 432B11, 432B12, 432B21, 432B22 disposed in the display area AA4 via the column driving circuit 462. As illustrated in the drawing, the display area AA4 is divided into five sections by lines parallel to the Y-axis. The five sections include B1 zones ZB41, A zones ZA4, and a B2 zone ZB42. The B1 zones ZB41 are left and right side areas of the display area AA4 and each area includes R-shaped corners. The A zones ZA4 are next to the respective B1 zones ZB41 and have a rectangular shape. The B2 zone ZB42 is a middle area of the display area AA4 and includes the recessed section (the display area is divided into zones such that an area of the A zone ZA4 is largest as possible). With such a configuration, the line length of the source lines 432B11, 432B12 disposed in the B1 zone and the line length of the source lines 432B21, 432B22 disposed in the B2 zone are shorter than the line length of the source line 432A disposed in the A zone and the number of pixels (a line load) connected to the source lines in the B1 zone and the B2 zone is smaller than that of the pixels connected to the source lines in the A zone. An electric resistance of the sources 432B11, 432B12, 432B221, 432B22 that correspond to the short pixel lines is smaller than an electric resistance of the source lines 432A that correspond to other pixel lines. Further, the line lengths of the source lines 432B11, 432B12, 432B21, 432B22 disposed in the B1 zone ZB41 and the B2 zone ZB42 differ from each other according to the respective addresses thereof. Therefore, luminance unevenness may be caused within each of the B1 zone ZB41 and the B2 zone ZB42. The source line 432B12 that is disposed closer to an outer side (on an opposite side from the zone ZA4) in the B1 zone ZB41 is shorter than the source line 432B11. The source line 432B22 that is disposed closer to a middle (on an opposite side from the A zone ZA4) is shorter than the source line 432B21 (in the B1 zone ZB41 and the B2 zone ZB42, the source lines 432B12, 432B22 correspond to the short pixel lines, the source lines 432B11, 432B21 correspond to other pixel lines).

As illustrated in FIG. 13, also in the fourth embodiment, the column driving circuit 462 includes three kinds of connection switches 465A, 465B, 465C. The relation of the ON resistance values of the connection switches is as follows: the connection switch 465A<the connection switch 465B<the connection switch 465C. The connection switch 465A having a small ON resistance value is disposed for the source line 432A having a relatively large electric resistance. In the fourth embodiment, the connection switch 465B having an intermediate ON resistance value is disposed for the source line 432B11 having a second largest electric resistance subsequent to that of the source line 432A and for the source line 432B22 that is in a middle of the display area AA4 with respect to the right and left direction. The connection switch 465C having an ON resistance value greater than that of the connection switch 465B is disposed for the source line 332B12 having an electric resistance smaller than that of the source line 432B11.

In the fourth embodiment, among the input-side column connection lines 474A, 474B11, 474B12, 474B21, 474B22, the input-side column connection lines 474B11, 474B12, 474B21, 474B22 have different material sections 475B1, 475B21, 475B22 (one example of the different resistance sections and the line resistance adjusting sections). The different material sections are formed of material different from that of other portions to change a resistance value of a unit distance portion. The different material sections 475B1, 475B21, 475B22 may be configured to have a line resistance smaller or greater than other portions. In the fourth embodiment, the different material sections 475B1, 475B21, 475B22 are configured to have a greater line resistance. A portion of each of the input-side column connection lines 474B11, 474B12, 474B21, 474B22 that are formed of a single-layer film or multi-layer film of copper or/and aluminum, for example, is formed of a single-layer film of molybdenum as the different material sections 475B1, 475B21, 475B22. The different material section may be formed by changing a ratio of layers or a compound ratio with respect to other portions of composite material or may be formed of material different from other portions that are made of single material or composite material.

In the fourth embodiment, the signal input terminals 40 from which image signals are input to the source lines are not disposed in the middle section of a mounting area of a driver 412 with respect to the right and left direction. In the fourth embodiment, as illustrated in FIG. 13, similar to the first embodiment, the X-axis dimension of the mounting area of the driver 412 is smaller than the X-axis dimension of the column driving circuit 462. The input-side column connection lines are routed such that an outline of an entire routing area thereof is a fan-like shape and is narrowed from the column driving circuit 462 toward the signal input terminals 40. Namely, the input-side column connection lines 474B11, 474B12 that are connected to the source lines 432GB11, 432B12 disposed in the B1 zone ZB41 closer to the outer side of the display area AA4 extend from the connection switches 465C, 465B, respectively, toward the input terminals 40 while being inclined closer to the center line CL. On the other hand, in the configuration of the fourth embodiment, the input-side column connection line 474B22 that is connected to the source line 432B22 near the center line CL of the display area AA4 extends from the connection switch 465B toward the input terminal 40 while being inclined so as to be away from the center line CL. Therefore, a relatively large routing space can be provided near the input-side column connection line 474B22. By using such a space, the line resistance adjusting section can be arranged without affecting the width of the frame area (without increasing the terminal-side non-display area TNAA). With considering the above matters, in the fourth embodiment, the source line 432B22 near the center line CL has a smaller line length and a smaller electric resistance than the source lines 432B12, 432B21. However, the source line 432B22 is connected to the connection switch 465B that has an ON resistance value smaller than that of the connection switch 476C that is connected to the source line 432B12, 432B21 and a relatively long different material section 475B22 is included for the source line 432B22 to increase the line resistance. The length of the different material section 475B1, 475B21, 475B22 is adjusted such that an electric resistance of each of the line paths including the respective connection switches 465A, 465B, 465C is substantially same. Accordingly, the electric resistance of each line path as a whole can be uniformed with high accuracy and the charging potential $V_{PX}$ of each pixel is substantially same regardless of its address and charging unevenness is less likely to be caused. Thus, the line resistance adjusting section such as the different material section, the large cross sectional area section, or the redundant line section is included while considering an arrangement space for the line resistance adjusting section. Accordingly, the electric resistance can be uniformed without increasing the frame area. As a result, the present technology can be applied to display panels of various kinds of configurations while keeping the design of a reduced frame width.

As described earlier, according to the fourth embodiment, the different material section is formed to adjust the line resistance to uniform the electric resistances. For example, the line resistance can be adjusted by changing a ratio of an amount of each material included in the different material section for every connection line. Adjusting of a resistance of a load (an ON resistance value of a connection switch) and adjusting of a line resistance (arrangement of the different material section) may be made in combination so that an electric resistance of each of the pixel lines (the source lines) can be uniformed while considering a routing space for the connection lines as described in the fourth embodiment.

Other Embodiments

The technology described herein is not limited to the embodiments described in the above descriptions and drawings. The following embodiments may be included in the technical scope of the technology described herein.

(1) In the first, third, and fourth embodiments, the input-side connection line includes the line resistance adjusting section; however, the pixel-side connection line may include the line resistance adjusting section.

(2) In the above embodiments, the liquid crystal panel is a transmissive liquid crystal panel including a backlight unit; however, the type of the liquid crystal panels is not limited thereto. The image display mechanism and the operation mode of the liquid crystal panel are not limited to specific mechanism and mode. The present technology may be applied to a reflection type liquid crystal panel or a transflective type liquid crystal panel, or liquid crystal panels that operate in various modes. Furthermore, application of the technology described herein is not limited to an active matrix substrate in a liquid crystal panel. The technology described herein may be applied to active matrix substrates in other types of display panels (organic EL panels, plasma display panels (PDPs), electrophoretic display (EPD) panels, micro electro mechanical systems (MEMS)).

The invention claimed is:

1. An active matrix substrate comprising:
   gate lines parallel to each other in a display area where pixels are located, the gate lines extending in a first direction;
   source lines parallel to each other in the display area, the source lines extending in a section direction perpendicular to the first direction;
   a signal input section that inputs a signal to the source lines, the signal input section being in an area outside the display area; and
   connection lines connected to the signal input section and the source lines, wherein
   the source lines include a short source line having a line length smaller than a line length of other source lines, and
   the connection lines include a first source connection line and second source connection lines,
   the first source connection line is connected to the short source line,
   the second source connection lines that are connected to the other source lines, respectively, and
   at least one of the first source connection line and the second source connection lines includes a line resistance adjusting section that adjusts a line resistance of the at least one of the first source connection line and the second source connection lines according to an electric resistance of a corresponding one of the source lines connected to the at least one of the first source connection line and the second source connection lines.

2. The active matrix substrate according to claim 1, wherein the line resistance adjusting section includes a redundant line section.

3. The active matrix substrate according to claim 1, wherein the line resistance adjusting section has an electric resistance per unit distance different from an electric resistance per unit distance of other sections of the at least one of the first source connection line and the second source connection lines.

4. The active matrix substrate according to claim 1, wherein the first source connection line includes a load,
   the second source connection lines include corresponding loads,
   the load of the first source connection line has a resistance greater than a resistance of each of the corresponding loads of a corresponding one of the second source connection lines.

5. A display panel comprising:
   the active matrix substrate according to claim 1; and
   a counter substrate that is opposite and bonded to the active matrix substrate.

6. The active matrix substrate according to claim 5, wherein the line resistance adjusting section includes a redundant line section.

7. The active matrix substrate according to claim 1, further comprising a driving circuit connected to the connection lines to drive the source lines, wherein
   the first source connection line includes a first input-side connection line and a first pixel-side connection line,
   the second source connection lines include second input-side connection lines and second pixel-side connection lines,
   the first input-side connection line is connected to the signal input section and the driving circuit,
   the first pixel-side connection line is connected to the driving circuit and the short source line,
   the second input-side connection lines are connected to the signal input section and the driving circuit,
   the second pixel-side connection lines are connected to the driving circuit and the other source lines and
   at least one of first input-side connection line and the second input-side connecting lines include the line resistance adjusting section.

8. An active matrix substrate comprising:
   pixel lines in a display area that includes pixels, the pixel lines being connected to the pixels, respectively;
   a signal input section that inputs a signal to the pixel lines;
   connection lines connected to the signal input section and the pixel lines; and a driving circuit provided for the connection lines and driving the pixel lines, wherein the pixel lines include a short pixel line having a line length smaller than a line length of other pixel lines, and the connection lines include a short pixel connection line connected to the short pixel line and other pixel connection lines connected to the other pixel lines, one of the short pixel connection line and the other pixel connection lines includes a line resistance adjusting section that adjusts a line resistance of the one connection line according to an electric resistance of the pixel line connected to the one connection line, the short pixel connection line includes an input-side connection line and a pixel-side connection line, the input-side connection line of the short pixel connection line is connected to the signal input section and the driving circuit, the pixel-side connection line of the short pixel connection line is connected to the driving circuit and the short pixel line, the other pixel connection lines include input-side connection lines and pixel-side connection lines, the input-side connection lines of the other pixel connection lines are connected to the signal input section and the driving circuit, the pixel-side connection lines of the other pixel connection lines are connected to the driving circuit and the other pixel lines, the driving circuit includes connection switches that connect the input-side connection lines and the pixel-side connection lines, the connection switches include a short pixel connection switch connected to the short pixel line and other connection switches connected to the other pixel lines, and the short pixel connection switch has an ON resistance value that is higher than an ON resistance value of the other connection switches.

9. The active matrix substrate according to claim 8, wherein the line resistance adjusting section has an electric resistance per unit distance different from an electric resistance per unit distance of other sections of the one of the short pixel connection line and the other connection lines.

10. The active matrix substrate according to claim 8, wherein the short pixel connection line includes a load, the other pixel connection lines include loads, the load of the short pixel connection line has a resistance greater than a resistance of each of the loads of a corresponding one of the other pixel connection lines.

11. A display panel comprising:

the active matrix substrate according to claim 8; and a counter substrate that is opposite and bonded to the active matrix substrate.

* * * * *